United States Patent [19]
Tachi et al.

[11] Patent Number: 6,156,257
[45] Date of Patent: Dec. 5, 2000

[54] REACTIVE INJECTION MOLDING PROCESS FOR MANUFACTURING A TWO-COLORED MOLDED POLYURETHANE PRODUCTS

[75] Inventors: Katsumi Tachi, Ichinomiya; Toshihiko Asaya, Nagoya, both of Japan

[73] Assignee: Toyoda Gosei Co., Ltd, Aichi-ken, Japan

[21] Appl. No.: 08/762,963

[22] Filed: Dec. 10, 1996

[30] Foreign Application Priority Data

Dec. 28, 1995 [JP] Japan .................................. 7-352872
Feb. 2, 1996 [JP] Japan .................................. 8-040533
Feb. 6, 1996 [JP] Japan .................................. 8-045407

[51] Int. Cl.⁷ .......................... B29C 45/16; B29C 67/20
[52] U.S. Cl. .................. 264/510; 264/102; 264/139; 264/161; 264/245; 264/255; 264/46.4; 264/46.6
[58] Field of Search ................... 264/510, 255, 264/46.4, 46.6, 46.7, 245, 101, 102, 139, 161

[56] References Cited

U.S. PATENT DOCUMENTS

| | | | |
|---|---|---|---|
| 3,883,629 | 5/1975 | Garner et al. | 264/55 |
| 4,389,454 | 6/1983 | Horacek et al. | 428/318.6 |
| 4,738,157 | 4/1988 | Nishijima et al. | 74/552 |
| 5,223,193 | 6/1993 | Bianchin et al. | 264/45.7 |
| 5,536,458 | 7/1996 | Kawakita et al. | 264/46.6 |
| 5,589,202 | 12/1996 | Okano et al. | 425/73 |

FOREIGN PATENT DOCUMENTS 6-143340  5/1994  Japan .

*Primary Examiner*—Jan H. Silbaugn
*Assistant Examiner*—Suzanne E. McDowell
*Attorney, Agent, or Firm*—Pillsbury Madison & Sutro LLP Intellectual Property Group

[57] ABSTRACT

A polyurethane material is injected into a mold cavity having a reduced pressure to form e.g. the surface portion of a polyurethane covering for a steering wheel. A polyurethane material for forming a substantial inner portion thereof and free of any coloring matter is, then, injected into the cavity. Then, a polyurethane material containing coloring matter is injected into the cavity to form the remaining inner portion of the covering.

12 Claims, 42 Drawing Sheets

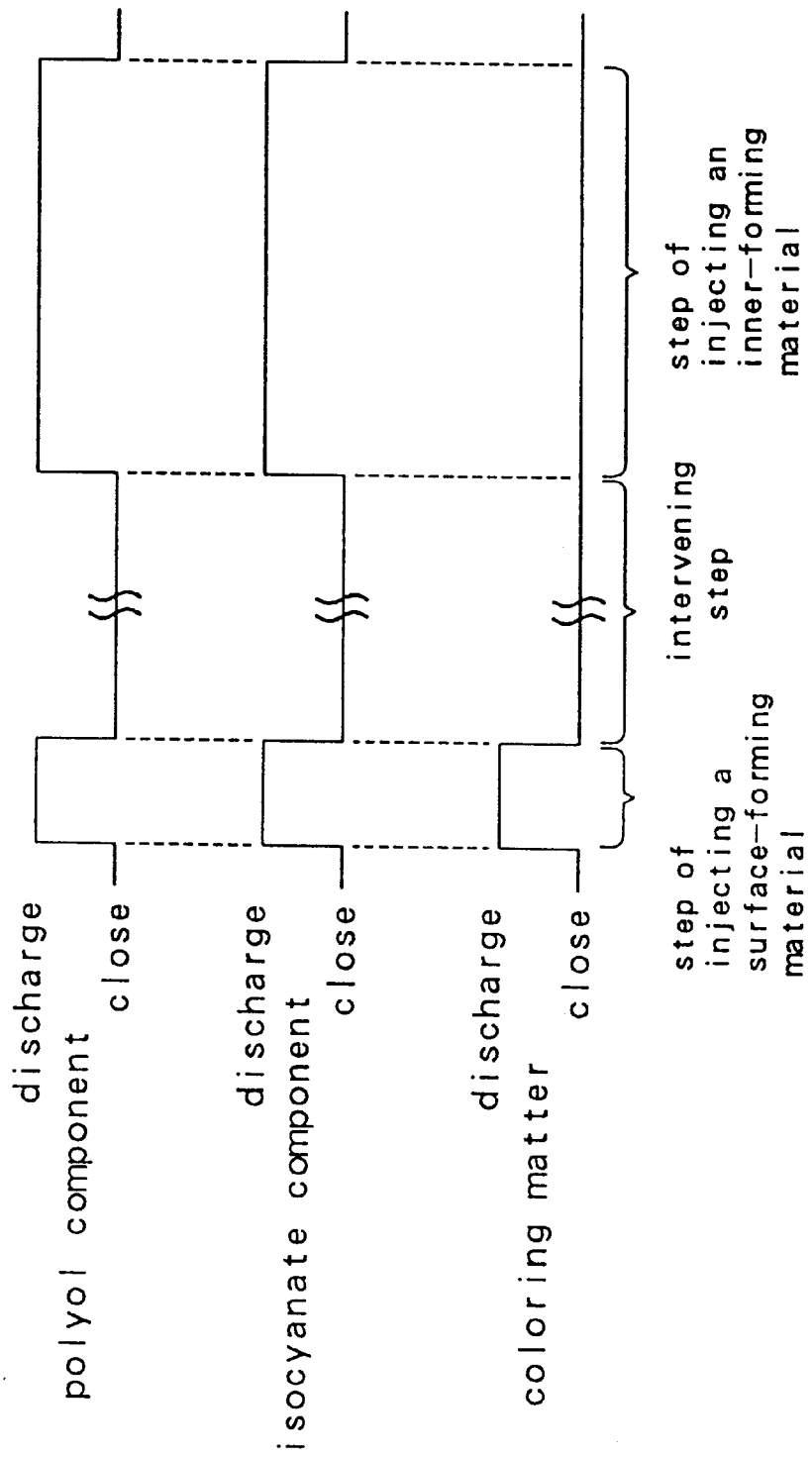

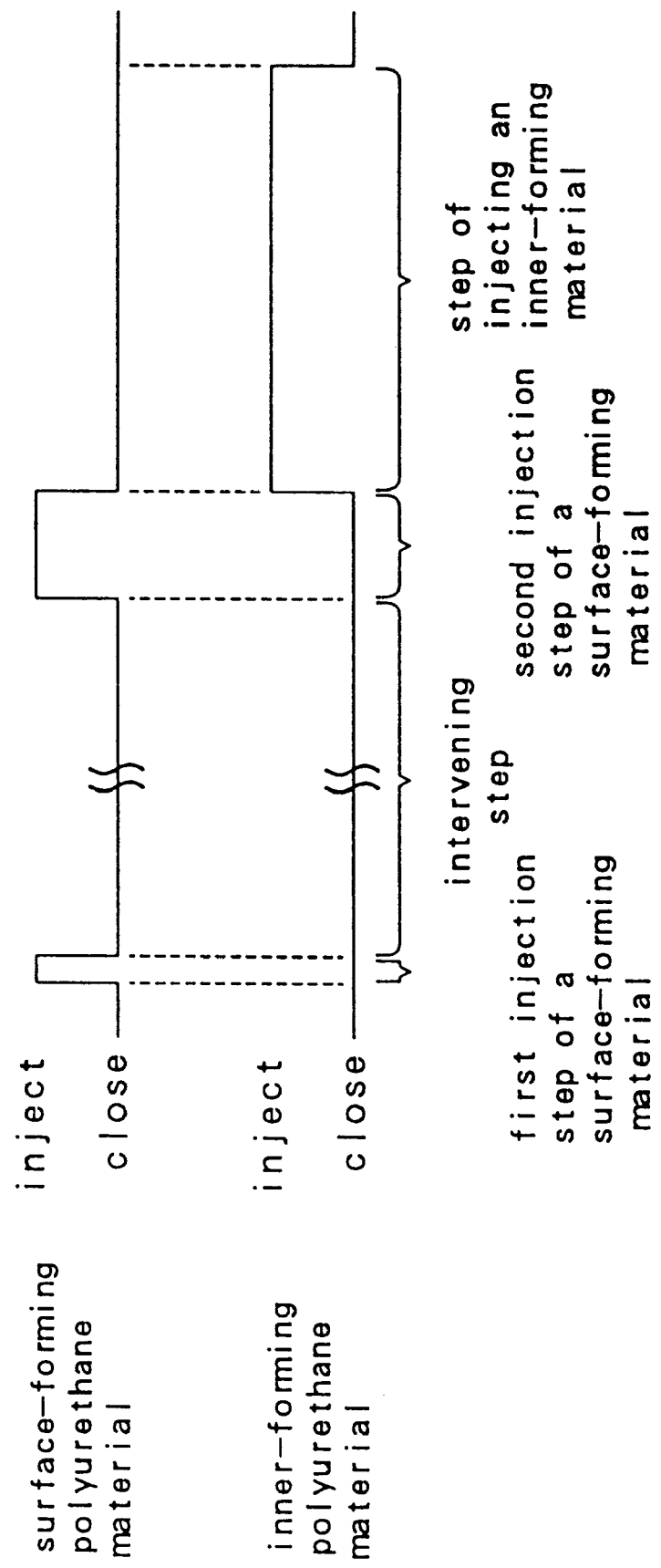

REACTIVE INJECTION MOLDING PROCESS FOR MANUFACTURING A TWO-COLORED MOLDED POLYURETHANE PRODUCTS

The priority applications, Japanese Patent Applications No. 7-352872, filed in Japan on Dec. 28, 1995, No. 8-40533, filed in Japan on Feb. 2, 1996, and No. 8-45407, filed in Japan on Feb. 6, 1996 are hereby incorporated into the present specification by reference.

BACKGROUND OF THE INVENTION

1. Field of the Invention

This invention relates to a reactive injection molding (RIM) process for manufacturing a two-colored molded polyurethane product having a surface portion and an inner portion differing from each other in color and properties. The invention also relates to a reactive injection molding process for manufacturing a molded polyurethane product containing a metal core.

2. Description of the Related Art

The assignee of the inventor of this invention has proposed a RIM process for manufacturing a molded product of polyurethanes as shown in FIGS. 42 and 43 (see Japanese Patent Application Laid-Open Specification No. 6-143340). The following is an outline of the process:

(1) The upper and lower portions 102 and 103 of a mold 100 are separated from each other, and a metal core 110 for a steering wheel is placed in its annular cavity 104. The upper and lower mold portions 102 and 103 are joined together, and a support pin 105 is moved to hold the metal core 110 in position;

(2) A vacuum pump 106 is operated to evacuate a vacuum casing 108, and the cavity 104 through a vent hole 107 and a clearance between the surfaces 102a and 103a of the mold portions mating each other along their parting line;

(3) A surface-forming polyurethane material U1 is injected into the cavity 104 having a reduced pressure. A sudden pressure drop to which the polyurethane material U1 having an elevated pressure is subjected causes it to scatter in the cavity 104 and adhere to substantially the entire wall surface surrounding the cavity 104 as a film forming the surface portion 112 of a polyurethane covering 111 for the steering wheel;

(4) An inner-forming polyurethane material U2 is injected into the cavity 104 remaining at a reduced pressure. The polyurethane material U2 undergoes foaming, flows in two directions to fill the cavity 104, and undergoes reactive curing to form the inner portion 113 of the polyurethane covering 111. A small amount of the polyurethane material U2 at the leading ends of its streams, as well as the material U1, flows out through the vent hole 107 and forms a solidified outflow 114, as shown in FIG. 42;

(5) The upper and lower mold portions 102 and 103 are separated from each other, and the polyurethane covering 111 containing the metal core 110 is removed from the cavity, as shown in FIG. 43. The outflow 114 which is separated from a vent-hole burr 115 formed in the vent hole 107 on that occasion is removed from the upper mold portion 102. The burr 115 adhering to the polyurethane covering 111 is manually cut off, as shown in FIG. 44.

The known process as outlined above facilitates the manufacture of a two-colored molded product of polyurethanes having a thin surface portion covering its inner portion, such as the polyurethane covering 111.

The process has a number of advantages. For example, it is possible to eliminate the work of applying a mold release agent if the surface portion 112 contains such an agent. It is possible to eliminate the work of applying coloring material if the surface portion 112 contains such a material. It is also possible to employ an appropriate catalyst in the surface portion 112 to give it a wide range of properties, such as touch and durability, differing from those of the inner portion 113.

Moreover, the process does not give any product having a defective appearance, if it is possible to remove through the vent hole 107 those parts of the inner-forming polyurethane material U2 at the leading ends of its streams which are unnecessary as they contain an excess of bubbles (composed of reactive gases, such as air and carbon dioxide). The process has, however, a number of drawbacks, too, as stated at (1) to (4) below.

(1) The polyurethane material U2 remaining in a gate 109 forms a gate burr 116 adhering to the polyurethane covering 111, as shown in FIG. 43. The burr 116 has to be cut off, but when it is cut off, the polyurethane covering 111 has a cut section 118 in which its inner portion 113 is exposed. If the polyurethane material U2 does not contain any coloring matter, while the surface-forming polyurethane material U1 contains one, the exposure of the uncolored inner portion 113 in the cut section 118 spoils the appearance of the covering 111.

(2) Although the surface-forming polyurethane material U1 adhering to the wall of the cavity 104, as stated at (3) above, may become somewhat higher in viscosity, it is still so flowable or moldable when the inner-forming polyurethane material U2 is injected, as stated at (4) above, that the streams of the polyurethane material U2 may cause a gradual flow of the polyurethane material U1 and thereby an undesirable reduction in thickness of the surface portion 112. This is particularly the case with the surface portion 112 formed in the vicinity of the gate 109 where it is affected by the polyurethane material U2 for a longer time than anywhere else.

If the polyurethane material U2 does not contain any coloring matter, while the polyurethane material U1 does, the reduction in thickness, as shown by broken lines, of the surface portion 112 in the vicinity of the gate 109 results in the exposure of the uncolored inner portion 113, or the unevenness in color density of the surface portion 112, as shown in FIGS. 46 and 47, and thereby damages the outward appearance of the covering 111.

If the polyurethane material U2 does not contain any mold release agent, while the polyurethane material U1 does, the reduction in thickness of the surface portion 112 in the vicinity of the gate 109 lowers the mold releasability of the product in that region.

If the polyurethane material U2 does not contain any catalyst, while the polyurethane material U1 does, the reduction in thickness of the surface portion 112 in the vicinity of the gate 109 lowers the properties of the product in that region.

If the inner-forming polyurethane material U2 is a common inexpensive one, while the surface-forming polyurethane material U1 is an expensive material of high performance (e.g. a non-yellowing one), the reduction in thickness of the surface portion 112 in the vicinity of the gate 109 makes the product fail to satisfy the standard for performance in that region.

(3) As the polyurethane material is allowed to flow out through the vent hole 107 at the leading ends of its streams, it is necessary before or after each cycle of molding operation to supply the vent hole 107 with a mold release agent for facilitating the removal of the burr 115 therefrom, to remove the outflow 114 from the upper mold portion 102, and to cut off the burr 115 manually from the covering 111. These additional jobs have lowered the efficiency of each cycle of molding operation. A high level of skill has been required for, above all, cutting off the burr 115 neatly, and however neatly it may have been cut off, a cutting mark 119 made on the covering 111 has spoiled its appearance and touch.

(4) The polyurethane material U1 is driven by the leading ends of the streams of the polyurethane material U2 flowing in two directions from the gate 109, as stated at (2) above, and gathers in a final filling portion 117 leading to the vent hole 107, as shown in FIGS. 46 and 48. If the polyurethane material U1 which has gathered in the final filling portion 117 stays there without flowing out through the vent hole 107, it has been likely that the difference in degree of shrinkage between the materials in the final filling portion 117 and anywhere else may result in a product lacking uniformity in outside diameter, touch, etc. Accordingly, it has also been likely that the polyurethane material U2 containing an excess of bubbles at the leading ends of its streams may not be allowed to flow out satisfactorily through the vent hole 107, resulting in a product having an outward appearance which is defective for pinholes. In order to overcome these problems, it has been necessary for the outflow 114 to have a weight of, say, 15 to 30 g.

Japanese Utility Model Laid-Open Specification Nos. 52-169233 and 52-169234 disclose a steering wheel including a covering having a portion fitted in a hollow portion of a metal core. This device is, however, intended for holding the covering against rotation about the core, and the covering is made by molding at normal pressure. Japanese Utility Model Laid-Open Specification No. 59-172067 discloses a steering wheel having a covering filling a hollow portion of a metal core. This device is, however, intended for reinforcing the core, and the covering is made by molding at normal pressure. Thus, none of their disclosures has anything to do with the technical concept of this invention.

SUMMARY OF THE INVENTION

Under these circumstances, it is a first object of this invention to prevent any inner portion of a two-colored molded product from being exposed in a cut section formed by cutting off a gate burr. It is a second object of this invention to prevent a two-colored molded product from having a surface portion reduced in thickness in the vicinity of a gate. It is a third object of this invention to enable the manufacture of a molded polyurethane product by reactive injection molding in a mold having no vent hole, and to thereby eliminate any and all jobs otherwise required when a mold uses a vent hole (such as supplying the vent hole with a mold release agent, removing an outflow of materials, and cutting off a vent-hole burr) for thereby achieving a reduction in number of jobs, an improved cycle of molding operation, and the manufacture of a molded product improved in outward appearance and touch.

According to a first aspect of the present invention, a reactive injection molding process for manufacturing a two-colored molded polyurethane product comprises the steps of creating a reduced pressure in a mold cavity and then injecting a surface-forming polyurethane material into the pressure reduced cavity. Then, an inner-forming polyurethane material is injected into the cavity that is still under reduced pressure using two steps. In a first step, an inner-forming polyurethane material free of any coloring matter is injected, and then an inner-forming polyurethane material that does contain coloring matter is injected during the second injection step.

According to a second aspect of the present invention, a reactive injection molding process for manufacturing a two-colored molded polyurethane product comprises the steps of creating a reduced pressure in a mold cavity and then injecting a surface-forming polyurethane material into the reduced pressure cavity. Thereafter, an inner-forming polyurethane material is injected into the cavity that is still under reduced pressure, after the surface-forming polyurethane material, previously injected into the cavity, is cured to the extent that it may not be reduced in thickness by the subsequently injected inner-forming polyurethane material.

The curing of the surface-forming polyurethane material can be achieved by the following exemplified means;

(1) The surface-forming polyurethane material has a higher rate of urethane reaction than the inner-forming one;

(2) Extra time is allowed for the surface-forming polyurethane material, injected during the step of injecting a surface-forming polyurethane material, to cure between the steps of injecting the surface-forming polyurethane material and the inner-forming polyurethane material; and (3) The step of injecting the surface-forming polyurethane material is divided into a first injection step and a second injection step, a step of extra time for allowing the surface-forming polyurethane material, injected during the first injection step, to cure intervenes between the first and second injection steps.

In the above (2) or (3) procedures, the step of injecting an inner-forming polyurethane material may be divided into a first injection step and a second injection step, an inner-forming polyurethane material free of any coloring matter may be injected during the first injection step, and an inner-forming polyurethane material containing coloring matter may be injected during the second injection step.

According to a third aspect of the present invention, a reactive injection molding process for manufacturing a two-colored molded polyurethane product can comprise the steps of placing in a mold cavity a metal core having a hollow portion and having at least one open hole which is connected with the hollow portion, and locating the open hole in a final material filling portion of the cavity. Then after mold closure, a reduced pressure is created in the cavity and in the hollow portion by evacuating that space through the open hole. Thereafter, a surface-forming polyurethane material is injected into the reduced pressure cavity and then an inner-forming polyurethane material is injected into the cavity so that the leading ends of the streams of the inner-forming polyurethane material reach the final material filling portion and flow into the hollow portion through the open hole during the step of injecting the inner-forming polyurethane material.

In this third aspect of the present invention, the metal core may be supported by at least one support pin having a communicating passage and may have a suction hole other than the open hole in which the pin can be connected to connect the passage with the hollow portion, and the hollow portion may be evacuated through the suction hole and the passage, as well as through the open hole.

The process according to this third aspect can be employed for manufacturing, for example, a polyurethane covering for a steering wheel including a metal core having a hollow tubular ring connected to outer ends of spokes extending from a boss. The ring preferably has such an open hole or holes formed in the vicinity of the end or ends of a spoke or spokes.

The process according to any of the first to third inventions may further include any of the following limitations:

(a) The surface-forming polyurethane material may contain coloring matter, while the inner-forming one does not;

(b) The surface-forming polyurethane material can contain a mold release agent, while the inner-forming one does not;

(c) The surface-forming polyurethane material can contain a catalyst for modifying the properties, while the inner-forming one does not;

(d) The surface-forming polyurethane material can have a higher rate of urethane reaction than the inner-forming one; and (e) The surface-forming polyurethane material may be one which does not undergo yellowing, while the inner-forming one does.

Further objects of this invention will become evident upon an understanding of the illustrative embodiments described below. Various advantages not specifically referred to herein but within the scope of the instant invention will occur to one skilled in the art upon practice of the presently disclosed invention. The following examples and embodiments are illustrative and not seen to limit the scope of the invention.

BRIEF DESCRIPTION OF THE DRAWINGS

FIG. 18 is a chart showing the timing for changing the material to be injected in the same process;

FIG. 27 is a chart showing the timing for changing the material to be injected in a process according to an eighth embodiment of this invention;

DETAILED DESCRIPTION OF THE PREFERRED EMBODIMENTS

Figure 1:
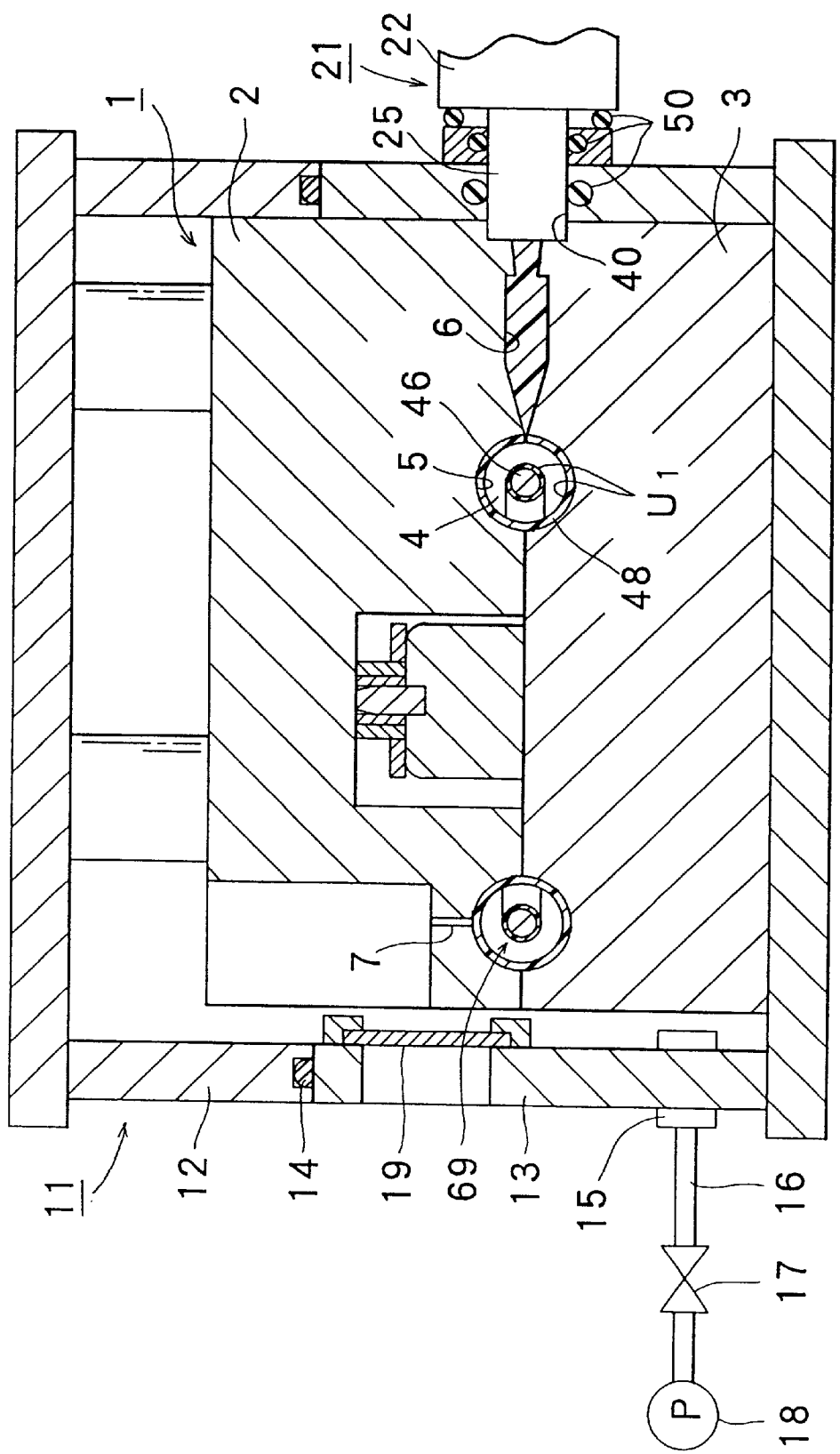
FIG. 1 is a sectional view showing the step of injecting a surface-forming material in a process according to a first embodiment of this invention.

Description will now be made of the reactive injection molding of two-colored polyurethane coverings for steering wheels by processes embodying this invention with reference to the drawings.

First Embodiment

Reference is first made to FIGS. 1 to 11 showing a first embodiment of this invention. This process employs a molding apparatus including a mold 1, a vacuum casing 11 and a material injection mechanism 21, as shown in FIGS. 1 to 8, and as will hereinafter be described in detail.

The mold 1 comprises an upper portion 2 and a lower portion 3 which are separate from each other. The upper and lower mold portions 2 and 3 define therebetween an annular cavity 4 formed by their cavity walls 5 and a gate 6 leading to the cavity 4 when they are joined together along a parting line. The upper mold portion 2 has a vent hole 7 formed in its final filling portion which is the last portion to be filled with a polyurethane material.

The vacuum casing 11 comprises an upper portion 12 and a lower portion 13 which are separate from each other. The upper mold portion 2 is mounted in the upper casing portion 12, and the lower mold portion 3 is supported in the lower casing portion 13. The upper and lower casing portions 12 and 13 are connected to a clamping device not shown, and the lower casing portion 13 is vertically movable to be joined with, or separated from the upper casing portion 12 to thereby join the upper and lower mold portions 2 and 3, or separate them from each other. The upper casing portion 12 has an O-ring 14 held in a groove formed in its parting surface, so that the O-ring 14 may engage the parting surface of the lower casing portion 13 to form a seal between the upper and lower casing portions 12 and 13 when the casing 11 is closed. The upper and lower mold portions 2 and 3 when joined together have between their mating surfaces, along the whole circumference of the cavity 4, a clearance of 0.03 to 0.06 mm which is unavoidable due to the limited dimensional accuracy of the mold, or is intentionally formed.

The lower casing portion 13 is provided with a suction plug 15 to which a vacuum pump 18 is connected through a suction hose 16 and a valve 17. The lower casing portion 13 has a gastight window 19 through which the vent hole 7 and its vicinity are visible from outside the vacuum casing 11.

Figure 8:
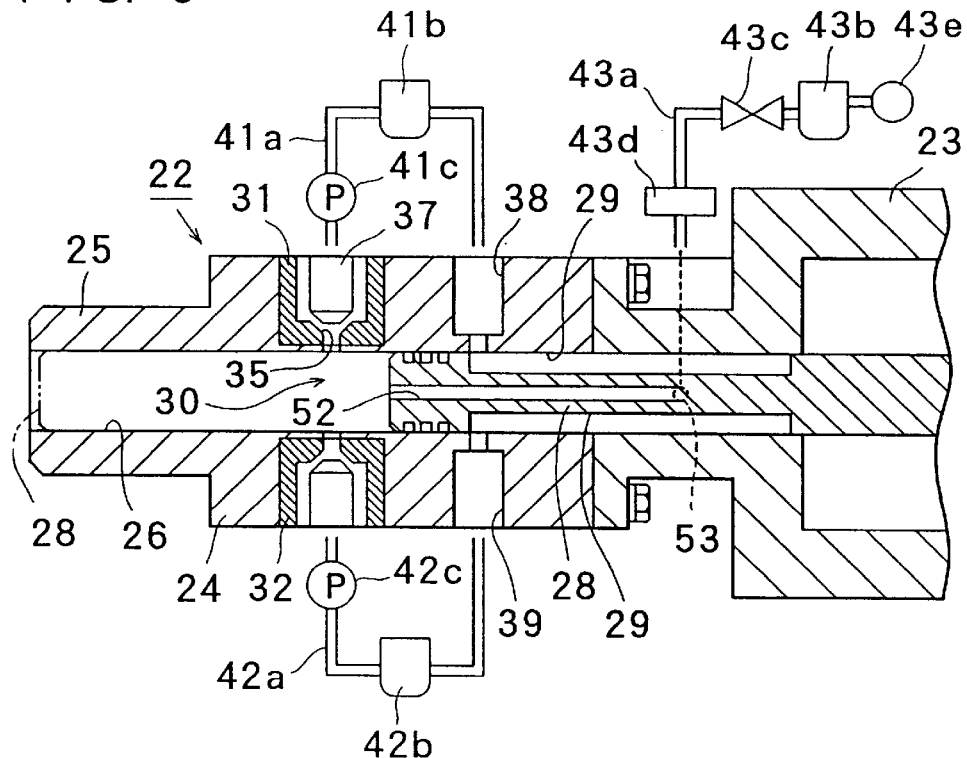
FIG. 8 is a sectional view of a mixing head employed in the process according to the first embodiment.

The material injection mechanism 21 includes a three-component mixing head 22, as shown in FIG. 8, which is used to mix principal, or polyol and isocyanate, components and an auxiliary, or third component. The three-component mixing head 22 comprises a cylinder 23 and a body 24 attached to one end thereof that terminates in an injection nozzle 25.

The body 24 has a through bore 26 in which a spool 28, attached to a piston (not shown) in the cylinder 23, is slidably fitted. The spool 28 has a pair of longitudinally extending elongated grooves 29 formed in its outer surface in a diametrically opposite relation to each other. The reciprocating motion of the piston causes the spool 28 to slide between its advanced position, shown by two-dot chain lines in FIG. 8, and its retracted position shown by solid lines, and a mixing chamber 30 for mixing the components, which will be described later in detail, is defined ahead of the spool 28 in its retracted position.

The body 24 has a cylindrical nozzle body 31 for the polyol component and a cylindrical nozzle body 32 for the isocyanate component fitted in a pair of diametrically opposite wall portions, respectively. Each nozzle body 31 or 32 has a tapered orifice 35 opening in the mixing chamber 30 or one of the grooves 29. A holder (not shown) is attached to the outer surface of the body 24 for holding each nozzle body 31 or 32, and a needle 37 extending therethrough has an end adapted to adjust the opening of the orifice 35. The body 24 also has a reflux or recycle hole 38 for the polyol component and a reflux or recycle hole 39 for the isocyanate component formed adjacent to the nozzle bodies 31 and 32, respectively, and connected with the grooves 29, respectively.

A tank 41b and a pump 41c for the polyol component are connected between the nozzle body 31 and the reflux hole 38 by a hose 41a to define a path for the circulation of the polyol component which starts at the tank 41b, goes through the pump 41c, the nozzle body 31, the corresponding groove 29 and the reflux hole 38, and ends at the tank 41b. Likewise, a tank 42b and a pump 42c for the isocyanate component are connected between the nozzle body 32 and the reflux hole 39 by a hose 42a to define a path for the circulation of the isocyanate component which starts at the tank 42b, goes through the pump 42c, the nozzle body 32, the corresponding groove 29 and the reflux hole 39, and ends at the tank 42b.

The spool 28 has an auxiliary discharge bore 52 formed along its longitudinal axis for discharging a third component. The auxiliary discharge bore 52 has a front end opening in the front end of the spool 28, and a rear end opening in the outer periphery of the spool 28 intermediate the ends thereof. The body 24 has an introduction hole 53 formed in its rear portion so as to be connected with the rear end of the auxiliary discharge bore 52 only when the spool 28 is in its retracted position. A tank 43b, a valve 43c and a flow control device 43d for the third component are connected to the introduction hole 53 by a hose 43a, and an air pressurizing device 43e is connected to the tank 43b to maintain an elevated pressure therein. The valve 43c may be situated in any location between the tank 43b and the body 24. The valve 43c may be of, for example, the pneumatically or electrically driven type. The opening and closing of the valve 43c are controlled by, for example, a special timer, or an internal timer in a sequence. The third component is a coloring matter obtained by dispersing a pigment in a polyol component.

The injection nozzle 25 in the three-component mixing head 22 extends through a through hole 40 formed in a wall of the lower casing portion 13, and is connected to the gate 6 in the lower mold portion 3. A plurality of O-rings 50 form a seal between the mixing head 22 and the through hole 40.

The process embodying this invention will now be described in the order of its steps for the manufacture, by a RIM process, of a polyurethane covering 47 comprising a surface portion 48 and an inner portion 49.

(1) The upper and lower mold portions 2 and 3 are separated from each other, and a mold release agent is applied to the cavity walls 5.

(2) A metal core 46 for a steering wheel 45 is set in the lower mold portion 3, and the upper and lower mold portions 2 and 3 are joined together to form the cavity 4, while the upper and lower casing portions 12 and 13 are joined together to close the vacuum casing 11 tightly.

(3) The vacuum pump 18 is driven to evacuate the vacuum casing 11 to an appropriate vacuum degree to create a reduced pressure in the cavity 4 by drawing out air through the vent hole 7 and the clearance between the mating surfaces of the mold portions 2 and 3.

(4) Step of injecting a surface-forming material:

The spool 28 is retracted, and the polyol and isocyanate components are discharged through the nozzle bodies 31 and 32, respectively, into the mixing chamber 30, while the valve 43c is opened to discharge a coloring matter as the third component through the auxiliary discharge bore 52 into the mixing chamber 30, so that they may impinge upon one another and be mixed together to form a surface-forming polyurethane material U1 (see FIGS. 1, 2, 4 and 9). The surface-forming polyurethane material U1 does not substantially contain any foaming agent. The polyurethane material U1 is discharged through the injection nozzle 25, and injected through the gate 6 into the cavity 4 maintained at a reduced pressure, as shown in FIG. 1. An injection time of about 1.0 second may be spent to inject a weight of about 150 g.

A sudden pressure drop to which the polyurethane material U1 having an elevated pressure is subjected upon injection causes the bumping of naturally adsorbed gases in the material U1 and thereby its scattering in the cavity 4 to form a film adhering to substantially the whole surfaces of the cavity walls 5 as the surface portion 48 of a polyurethane covering 47. The naturally adsorbed gases are the gases which the polyurethane material contains unintentionally and unavoidably, including very small amounts of gases which it contains inherently, and a small amount of air which has been entrained or dissolved in the polyurethane material during its circulation.

Figure 2:
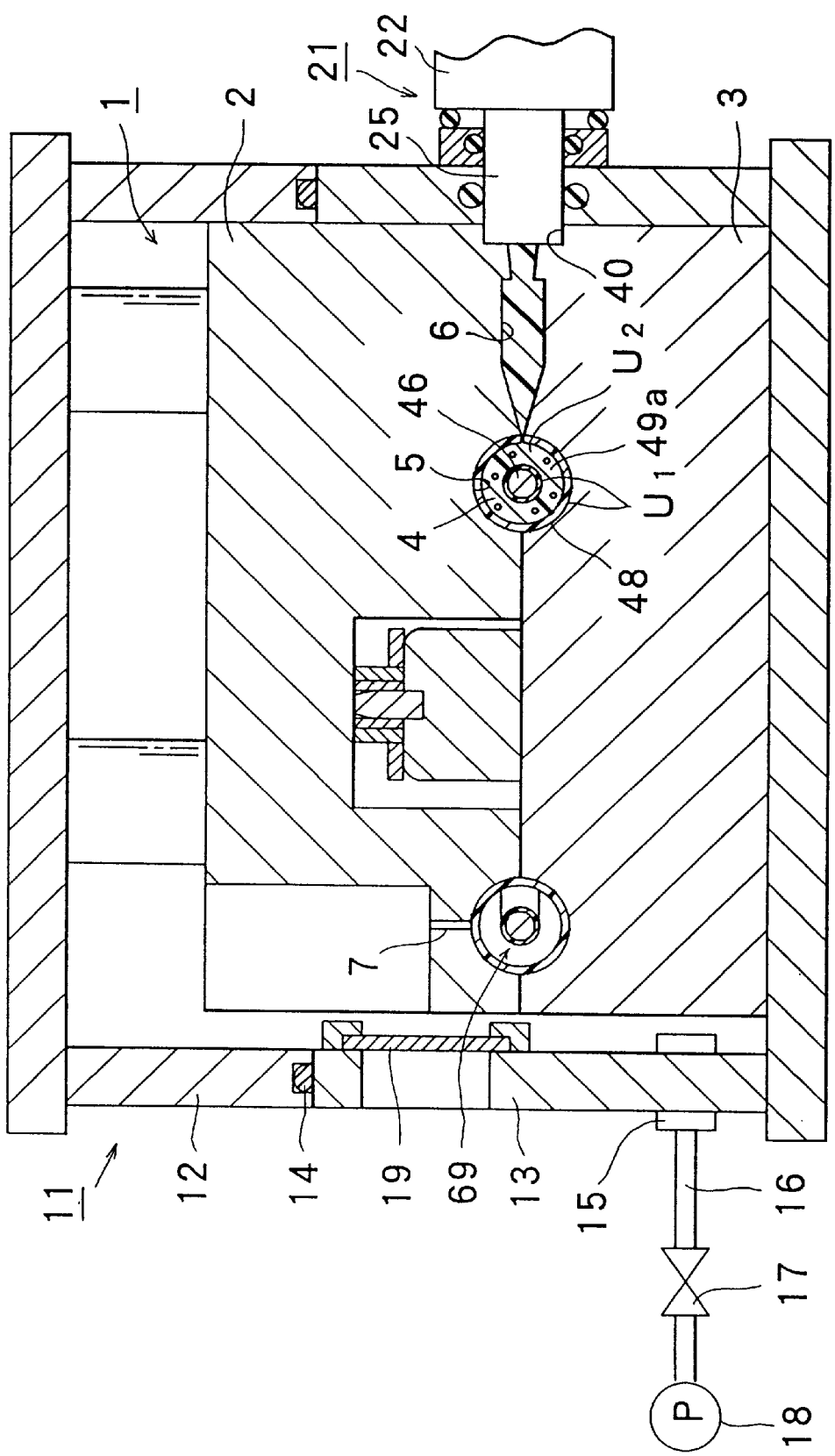
FIG. 2 is a sectional view showing the first injection step of an inner-forming material in the same process.
Figure 4:
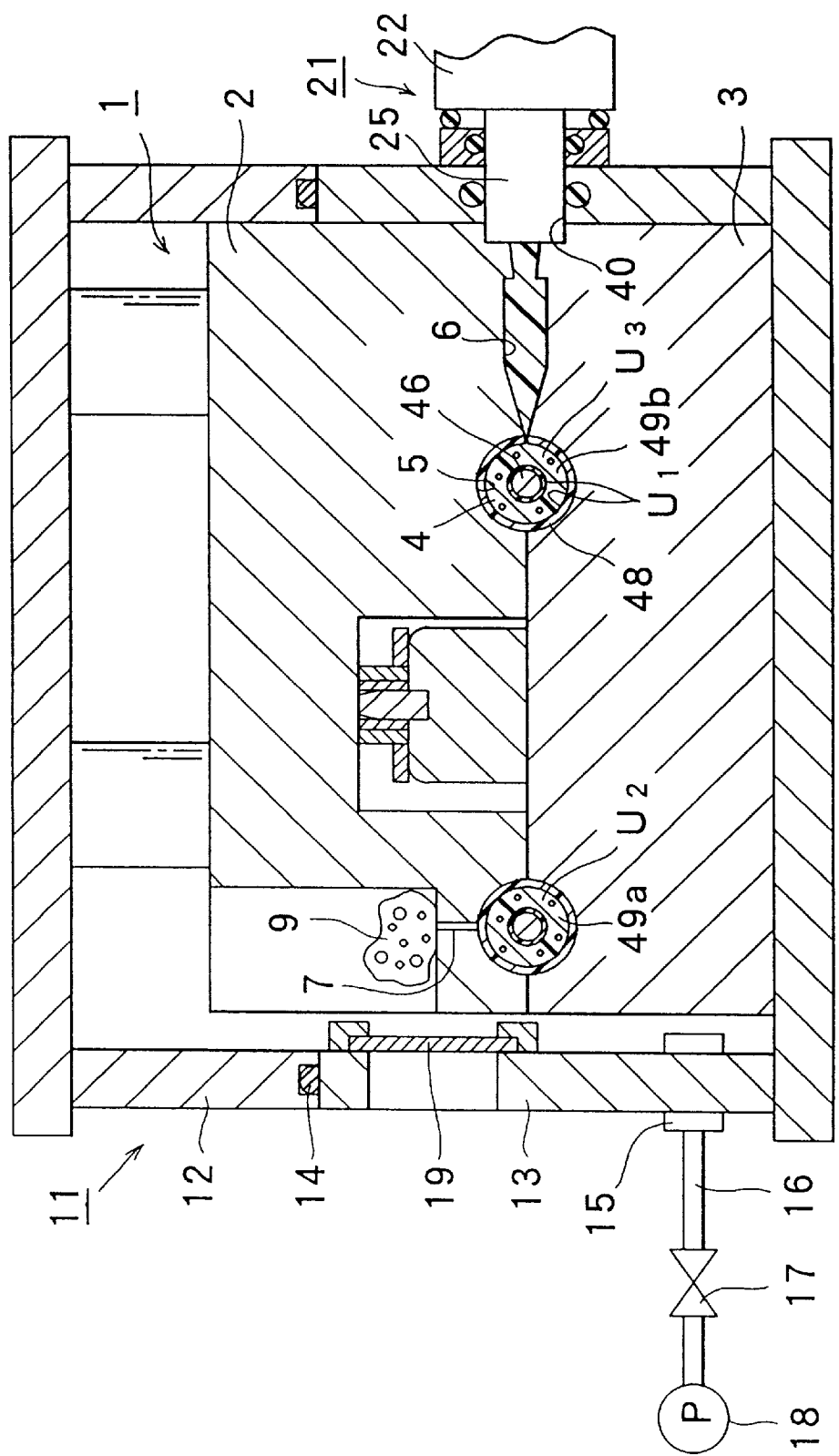
FIG. 4 is a sectional view showing the second injection step of an inner-forming material in the same process.
Figure 9:
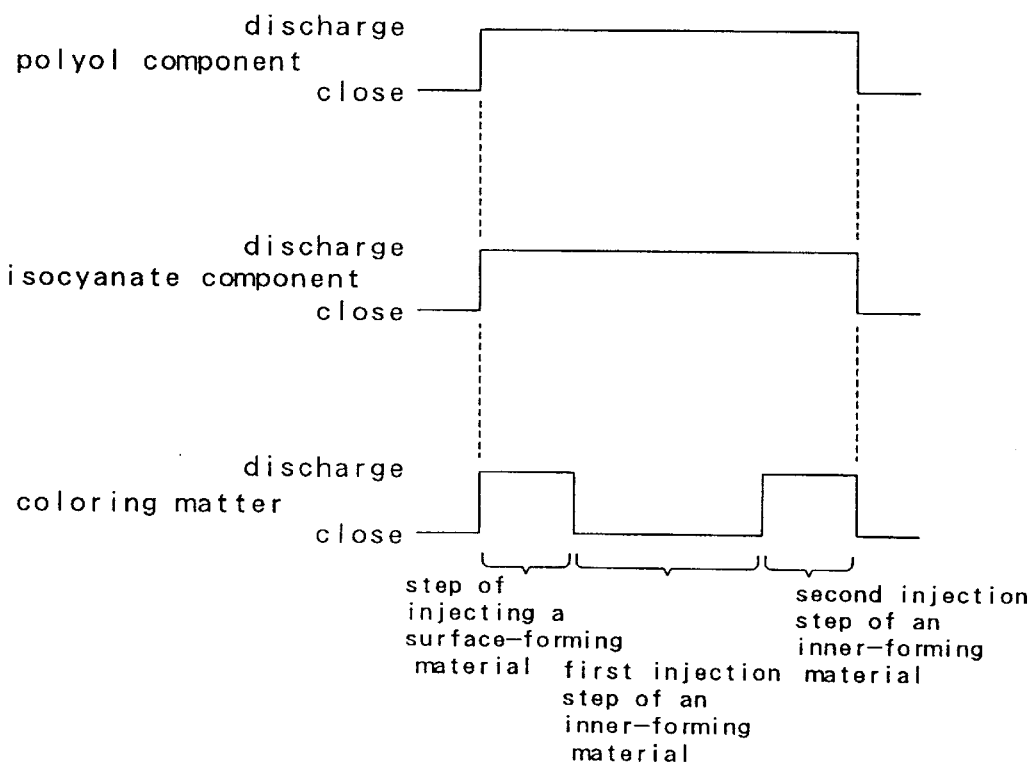
FIG. 9 is a chart showing the timing for changing the material to be injected in the same process.

(5) First injection step of an inner-forming material:

The valve 43c is closed to discontinue the discharge of the coloring matter as the third component, but the discharge of the polyol and isocyanate components is continued, so that they may collide and get mixed with each other to form an inner-forming polyurethane material U2 (see FIGS. 2, 4 and 9). The polyurethane material U2 does not substantially contain any foaming agent. The polyurethane material U2 is discharged through the injection nozzle 25, and injected through the gate 6 into the cavity 4 maintained at a reduced pressure, as shown in FIG. 2. An injection time of about 1.8 seconds may be spent to inject a weight of about 270 g.

Figure 3:
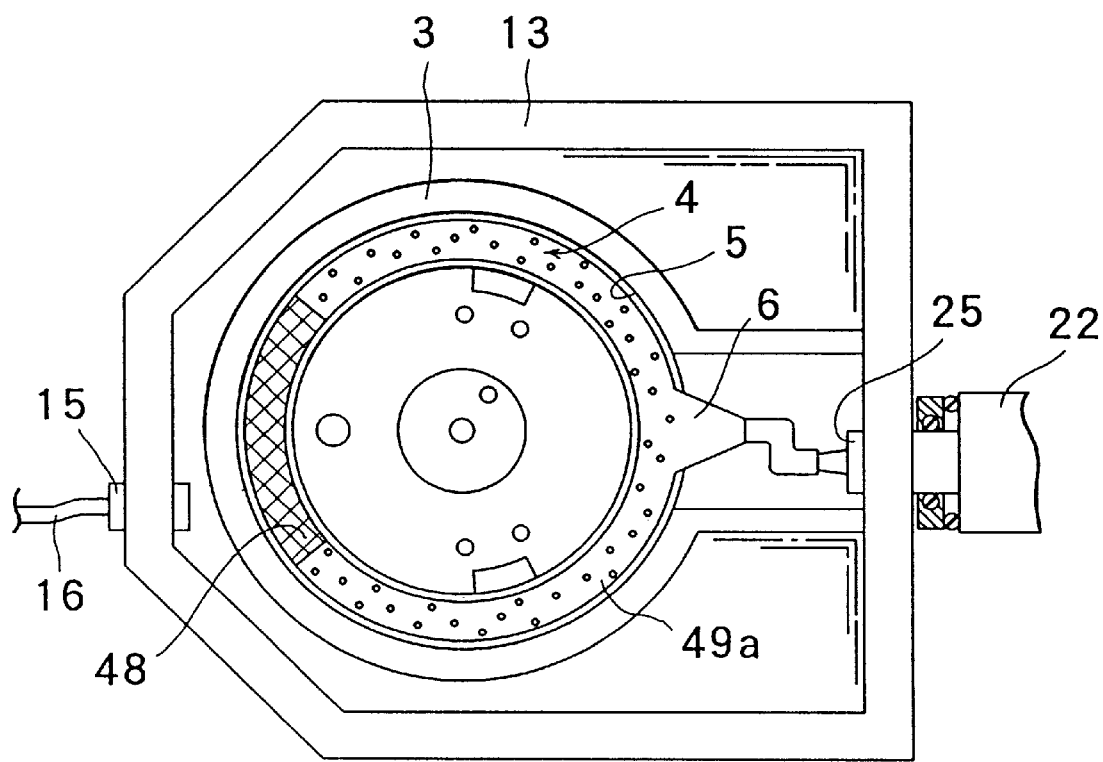
FIG. 3 is a top plan view of the lower portion of the mold shown in FIG. 2.

The polyurethane material U2 which has been injected foams, and flows in two directions through the cavity 4 to fill it. The polyurethane material U2 in a region far from the cavity walls 5 forms a highly foamed core as a result of the bumping of naturally adsorbed gases (equal to those in the surface-forming polyurethane material U1) in an environment having a reduced pressure. The material U2 near the cavity walls 5 forms a low foamed self-skin layer of high density by the degassing caused by the reduced pressure. The core and self-skin layer constitute the substantial whole 49a of the inner portion 49 (see FIG. 7B). The lower mold portion 3 at this stage of operation is shown in FIG. 3 (in which the metal core is not shown).

(6) Second injection step of an inner-forming material:

The valve 43c is opened again a little before the cavity 4 is filled with the inner-forming polyurethane material U2, so that the coloring matter as the third component may again be discharged through the auxiliary discharge bore 52 into the mixing chamber 30 to form an inner-forming polyurethane material U3 which is substantially equal to the surface-forming polyurethane material U1 (see FIGS. 4 and 9). The polyurethane material U3 is injected through the injection nozzle 25 into the cavity 4 that is still maintained at a reduced pressure, as shown in FIG. 4. An injection time of about 0.6 second may be spent to inject a weight of about 90 g.

Figure 5:
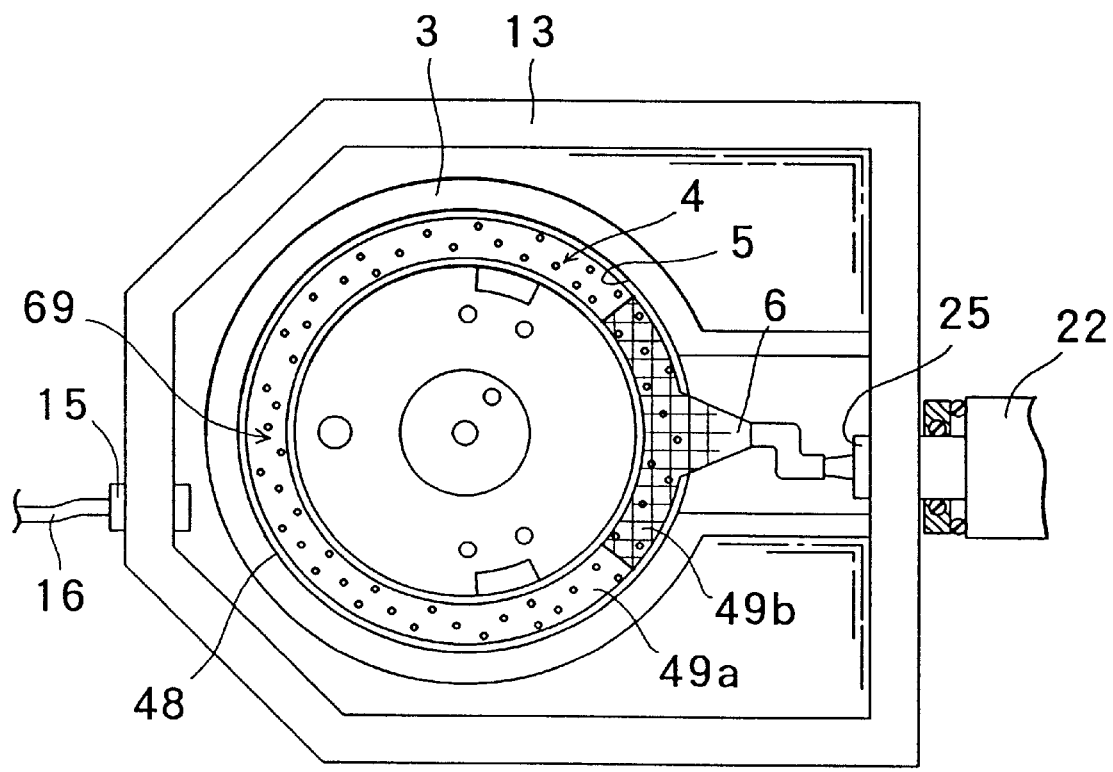
FIG. 5 is a top plan view of the lower portion of the mold shown in FIG. 4.
Figure 7A:
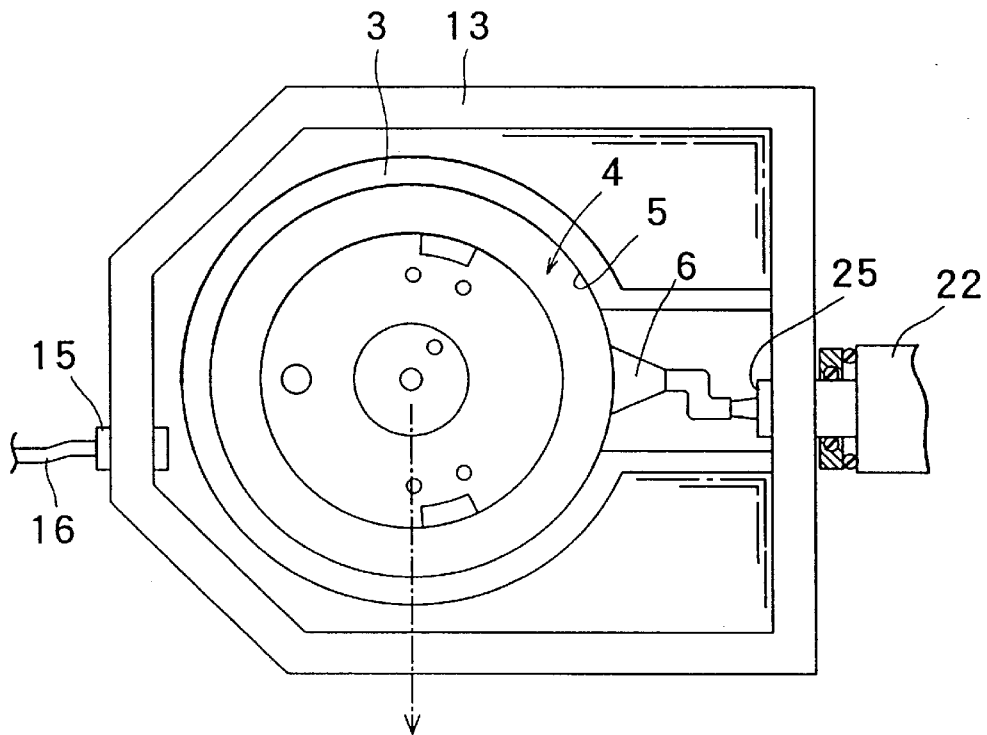
FIG. 7A is a top plan view of the lower mold portion.
Figure 7B:
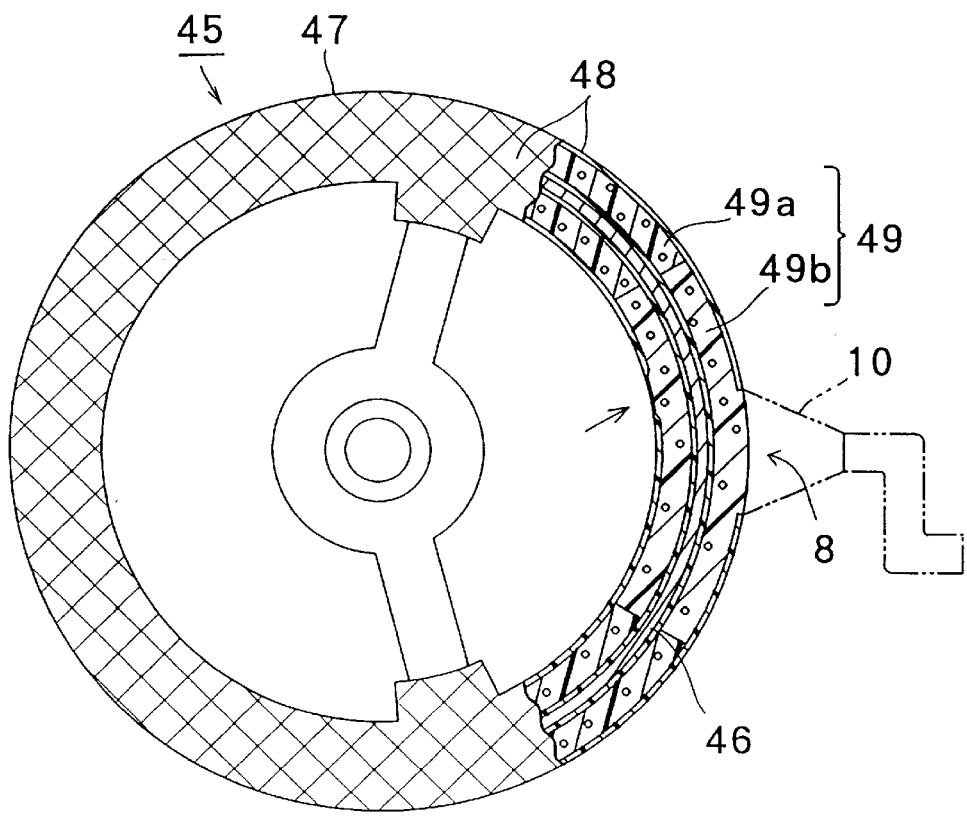
FIG. 7B is a top plan view, partly in section, of the molded product removed from the mold.

The polyurethane material U3 which has been injected forms a highly foamed core and a low foamed self-skin layer like the polyurethane material U2 to form the remaining part 49b of the inner portion 49 in the vicinity of the gate 6 (see FIG. 7B). The lower mold portion 3 at this stage of operation is shown in FIG. 5 (in which the metal core is not shown).

As a result, the cavity 4, as in FIG. 4, is filled with all of the materials U1, U2 and U3, and a small amount of the polyurethane material U2 at the leading ends of its streams flows out through the vent hole 7 and forms a solidified outflow 9.

Figure 6:
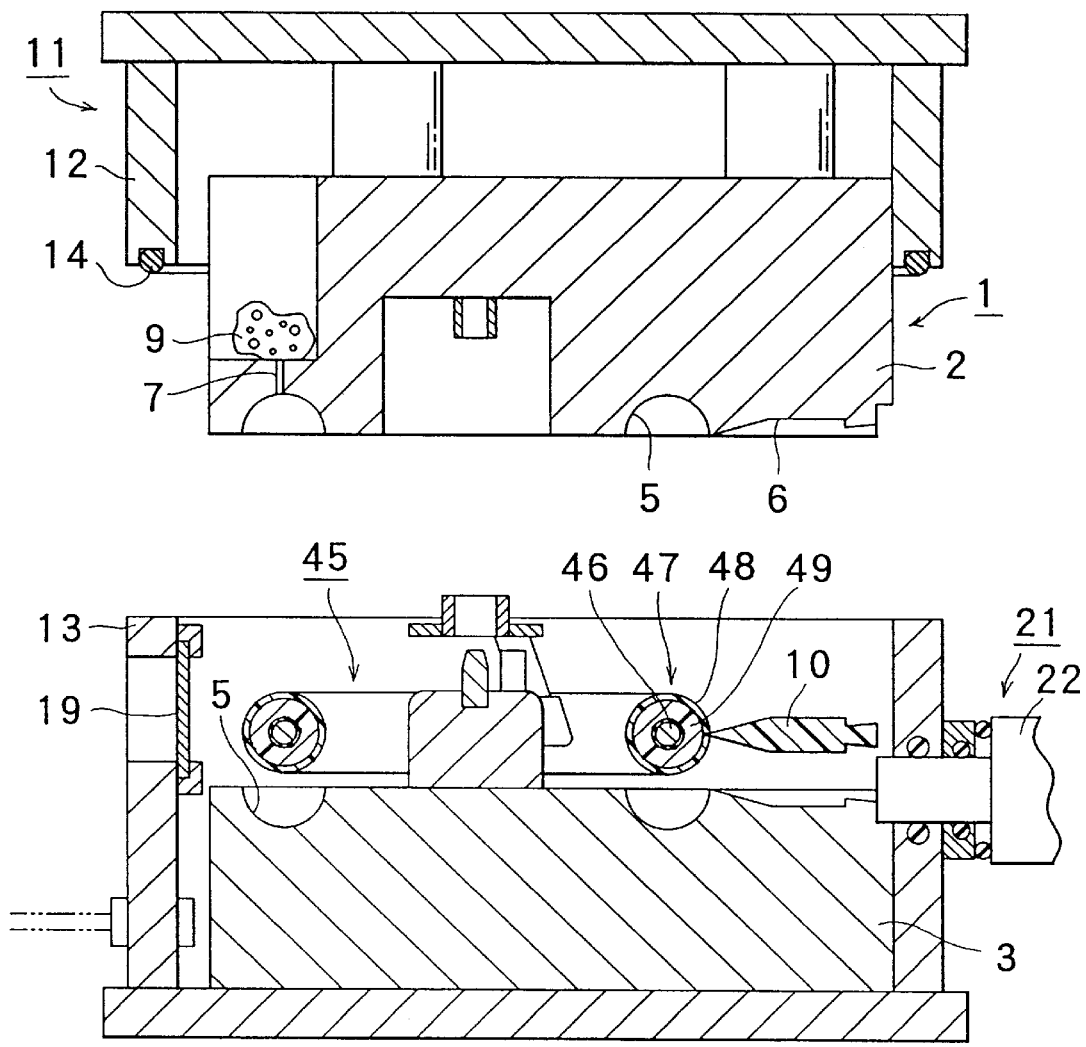
FIG. 6 is a sectional view showing the step of removing a molded product from the mold in the same process.
Figure 10:
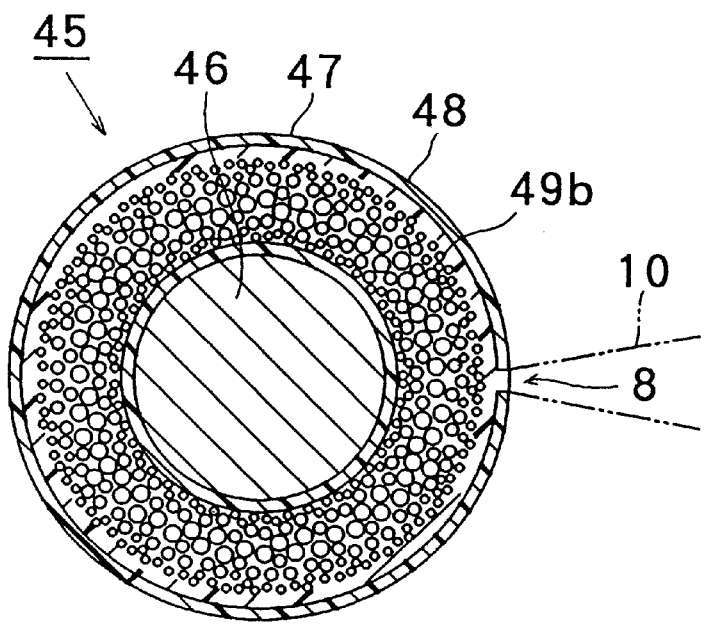
FIG. 10 is a cross-sectional view of the polyurethane covering molded by the same process.
Figure 11:
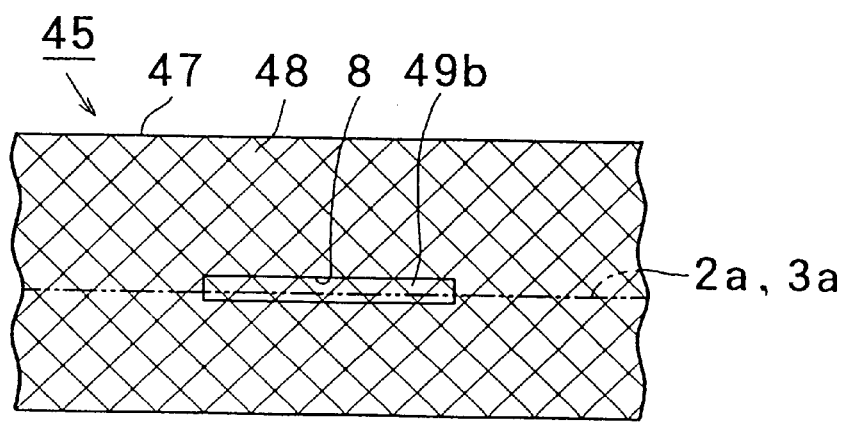
FIG. 11 is a front elevational view of a part of the same polyurethane covering.

(7) Step of removing the molded product from the mold:

After all of the materials U1, U2 and U3 have been allowed to cure, the upper and lower mold portions 2 and 3 are separated from each other, while the upper and lower casing portions 12 and 13 are separated from each other, as shown in FIG. 6, and the steering wheel 45 having the polyurethane covering 47 is removed from the mold, as shown in FIG. 7B. The polyurethane covering 47 has a gate burr 10 formed by the inner-forming polyurethane material U3 in the gate 6, and when it is cut off, the part 49b of the inner portion 49 formed in the vicinity of the gate 6 is exposed in a cut section 8, as shown in FIGS. 7B, 10 and 11. As the part 49b is colored by the same coloring matter as is used in the surface portion 48, however, the cut section 8 is of the same color with the surface portion 48, is hardly noticeable, and does not spoil its appearance. Therefore, the cut section 8 need not be painted.

If a delay in the reaction and curing of the surface-forming polyurethane material U1 causes a reduction in thickness of the surface portion 48 in the vicinity of the gate 6, as shown by a thick arrow in FIG. 7B, as a result of its flow forced by the inner-forming polyurethane material U2 injected during the first injection step of an inner-forming material, the part 49b of the inner portion 49 formed in the vicinity of the gate 6 is seen through that part of the surface portion 48 which has a reduced thickness. The exposed part 49b, however, does not spoil the appearance of the surface portion 48, or the steering wheel 45 as a whole, since it is of the same color with the surface portion 48 and is not readily noticeable.

In order to prevent any such reduction in thickness of the surface portion 48 in the vicinity of the gate 6, it is effective to raise the urethane reaction rate of the surface-forming polyurethane material U1 by, for example, adding a catalyst for promoting its urethane reaction to the third component. The surface portion 48 has a higher level of light resistance if a non-yellowing material of high light resistance is used as the surface-forming polyurethane material U1.

Other advantages of the process embodying this invention are:
(1) It is possible to omit the step of applying coloring matter to the cavity walls 5 before each molding operation;
(2) It is possible to keep the amount of the coloring matter to a minimum and thereby cut down the overall cost of manufacture.
(3) The pigment particles which the coloring matter contains wear those parts of the material injection mechanism 21 through which they pass, and any worn part has to be changed to a new one. Since the amount of coloring matter being used can be kept to a minimum, however, it is possible to delay such wear and prolong a cycle for the maintenance of the material injection mechanism 21 and the change of any worn part thus reducing the relevant work and cost.
(4) It is also possible to decrease the use of additives, such as an aging inhibitor, with the inner-forming polyurethane material U2.

Figure 12:
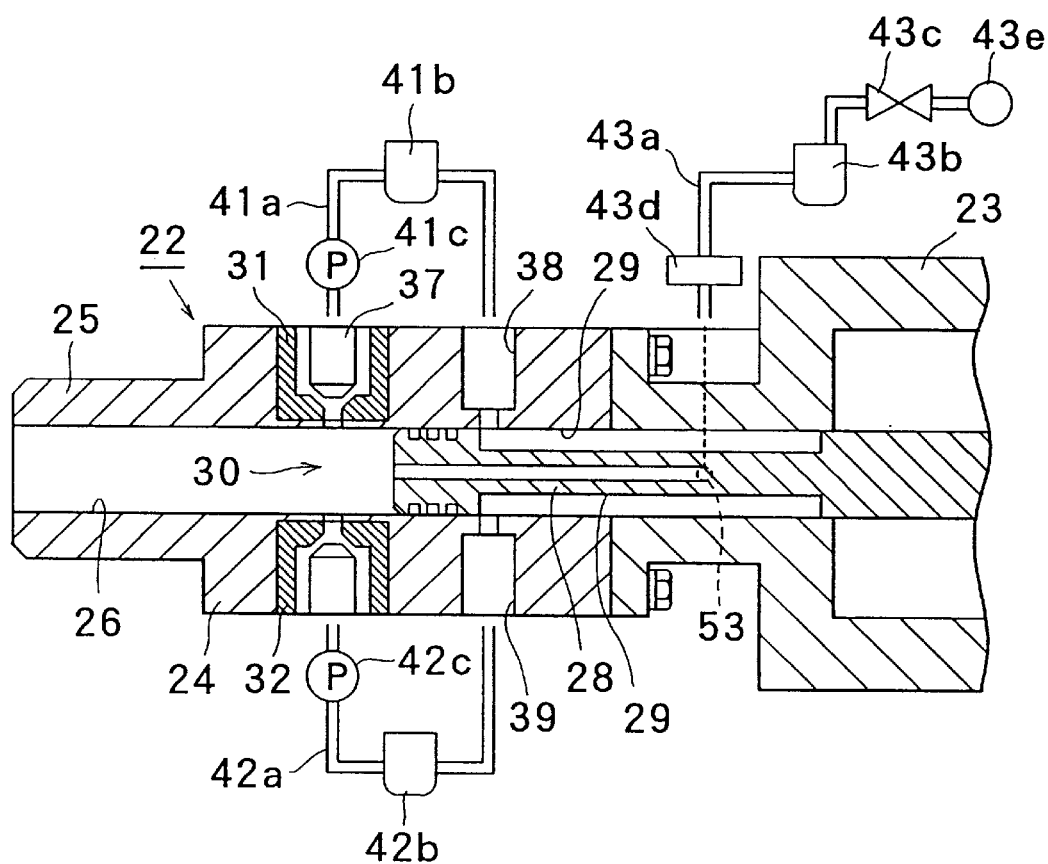
FIG. 12 is a sectional view of a modified mixing head.

The material injection mechanism 21 can be so modified as to have the valve 43c for the third component positioned between the tank 43b and the air pressurizing device 43e, as shown in FIG. 12, though the valve 43c may be opened and closed with the same timing as described before.

Second Embodiment

Figure 13:
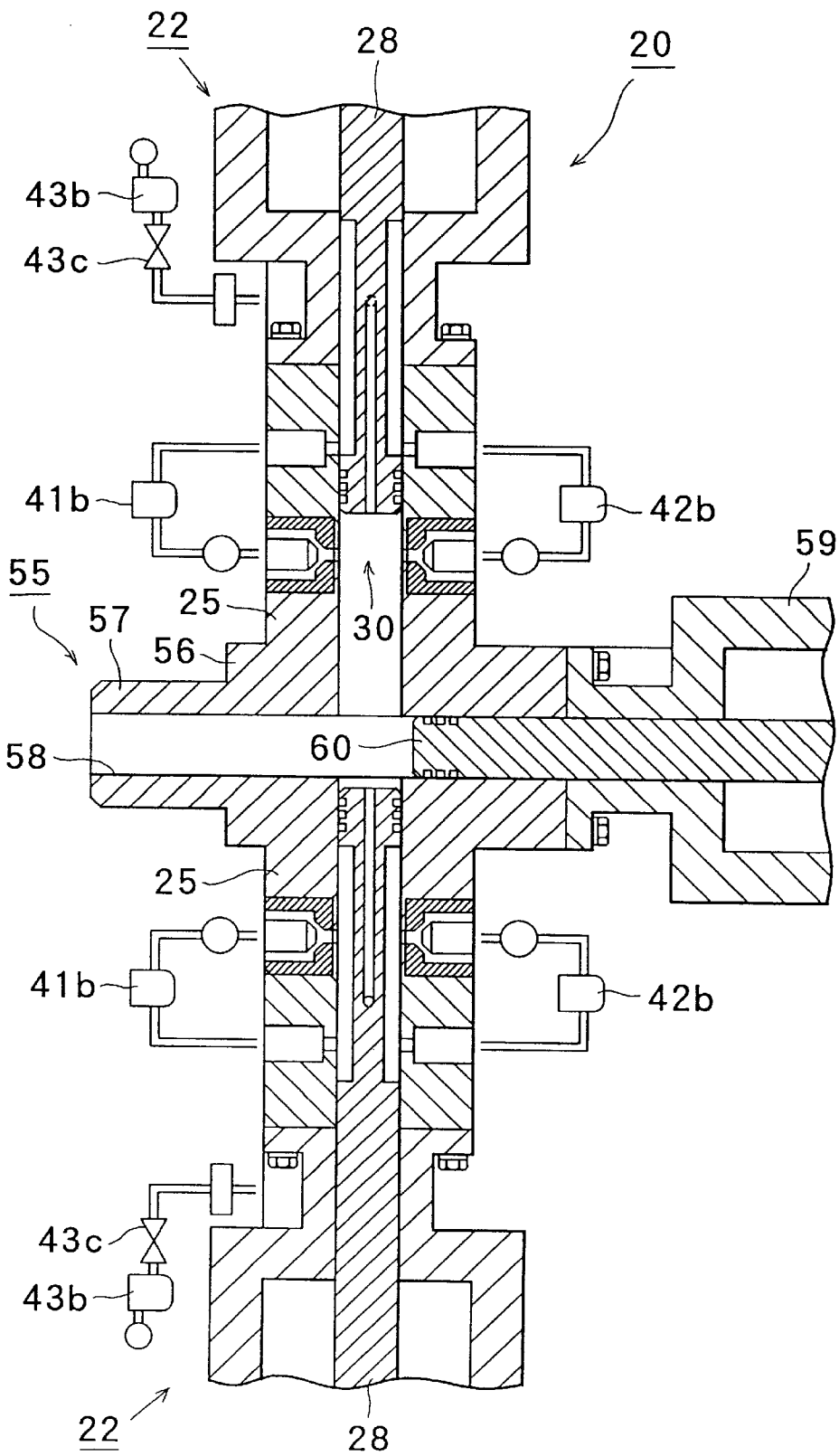
FIG. 13 is a sectional view of a mixing head employed in a process according to a second embodiment of this invention.
Figure 14:
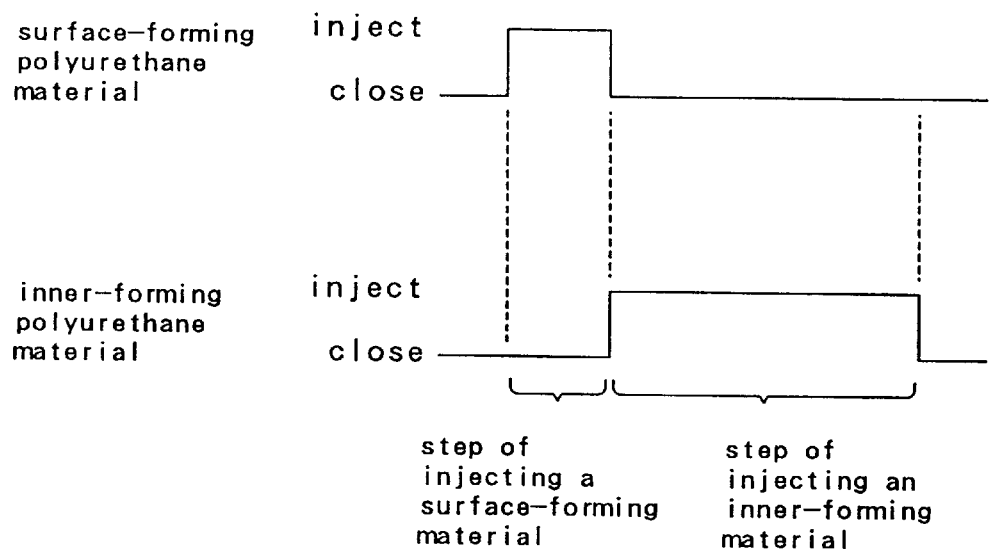
FIG. 14 is a chart showing the timing for changing the material to be injected in the same process.
Figure 15:
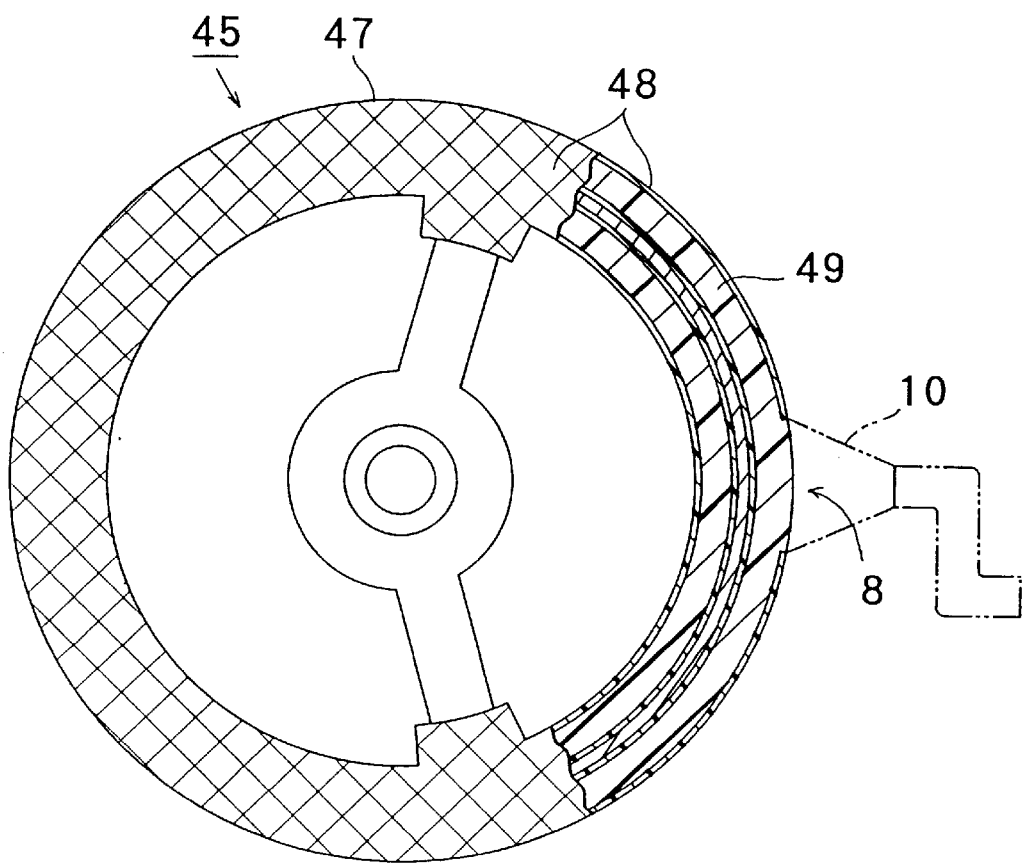
FIG. 15 is a top plan view of a polyurethane covering molded by the same process.

Reference is now made to FIGS. 13 to 15 showing a second embodiment of this invention. This process employs a six-component mixing head 20 which comprises two three-component mixing heads 22 connected to a central injection mechanism 55, as shown in FIG. 13, and each having the construction as described before. The upper three-component mixing head 22, as viewed in FIG. 13, is employed for preparing a surface-forming polyurethane material U1 of high performance (e.g. a non-yellowing material of high light resistance), which contains as the third component a coloring matter obtained by adding a pigment and a catalyst for promoting the urethane reaction to a polyol component. The lower mixing head 22 is employed for preparing an inner-forming polyurethane material U2 of regular quality (e.g. a yellowing material), which may or may not contain a catalyst, or other additives as the third component. The injection mechanism 55 has a body 56 connecting two injection nozzles 25, and ending in an injection nozzle 57. The body 56 has a through bore 58 to which the two injection nozzles 25 are open, and in which a spool 60, attached to a piston (not shown) in a cylinder 59, is slidably fitted.

The process embodying this invention will now be described in the order of its steps taken for the manufacture of a polyurethane covering 47, shown in FIG. 15, by RIM:
(1) Equal to step (1) of the process according to the first embodiment.
(2) Equal to step (2) thereof.
(3) Equal to step (3) thereof.
(4) Step of injecting a surface-forming material:

The spool 28 in the upper three-component mixing head 22 is retracted, and its mixing chamber 30 is charged with polyol and isocyanate components of high performance, and a combination of a coloring matter and a catalyst for promoting the urethane reaction as a third component, so that they may collide and get mixed with one another to form a surface-forming polyurethane material U1 of high performance (see FIG. 14). The spool 28 in the lower mixing head 22 is kept in its advanced position to prevent any material from being charged into its mixing chamber. Step (4) of the process according to the first embodiment is substantially repeated for injecting the surface-forming polyurethane material U1 into the cavity 4, held at a reduced pressure, through the injection nozzle 57 of the injection mechanism 55 (substantially as shown in FIG. 1). An injection time of about 0.9 second may be spent to inject a weight of about 135 g.

The polyurethane material U1 which has been injected adheres to substantially the whole surfaces of the cavity walls 5 as a film forming the surface portion 48 of a polyurethane covering 47, as is the case with the process according to the first embodiment. The polyurethane material U1 employed by the process under description, however, contains a catalyst for promoting the urethane reaction, and such a urethane reaction proceeds promptly after its adherence to the cavity walls. It is, accordingly, cured to an extent that it may not be reduced in thickness by the subsequently injected streams of the inner-forming polyurethane material U2, by the time material U2 is injected, thereby preventing the reduction in thickness of the surface portion 48.
(5) Step of injecting an inner-forming material:

The spool 28 in the lower mixing head 22 is retracted, and its mixing chamber 30 is charged with polyol and isocyanate components of regular quality (and a third component, if any), so that they may collide and get mixed with each other to form an inner-forming polyurethane material U2 of regular quality (see FIG. 14). The spool 28 in the upper mixing head 22 is advanced to prevent any material from being charged into its mixing chamber. Step (5) of the process according to the first embodiment is substantially repeated for injecting the polyurethane material U2 into the cavity 4, that is still maintaining at a reduced pressure, through the injection nozzle 57 (substantially as shown in FIG. 2). An injection time of about 2.5 seconds may be spent to inject a weight of about 375 g.

The polyurethane material U2 which has been injected forms an inner portion 49 comprising a highly foamed core and a low foamed self-skin layer, as is the case with the process according to the first embodiment. According to the process under description, however, the polyurethane material U2 fills the cavity 4 completely.
(6) Step of removing a molded product from the mold:

After all of the materials U1 and U2 have been allowed to cure, step (7) of the process according to the first embodiment is substantially repeated for opening the mold to remove therefrom a steering wheel 45 having the polyurethane covering 47 as shown in FIG. 15. If a gate burr 10 is cut off, the inner portion 49 composed of the colorless polyurethane material U2 is exposed in a cut section 8, and the cut section 8 has, therefore, to be painted.

The promoted reaction of the polyurethane material U1, however, prevents any undesirable reduction in thickness of the surface portion 48, as stated above, and thereby ensures that the outward appearance of the molded product not be spoiled by the inner portion 49 seen through the surface portion 48, or by the surface portion 48 lacking uniformity in color density.

Figure 48:
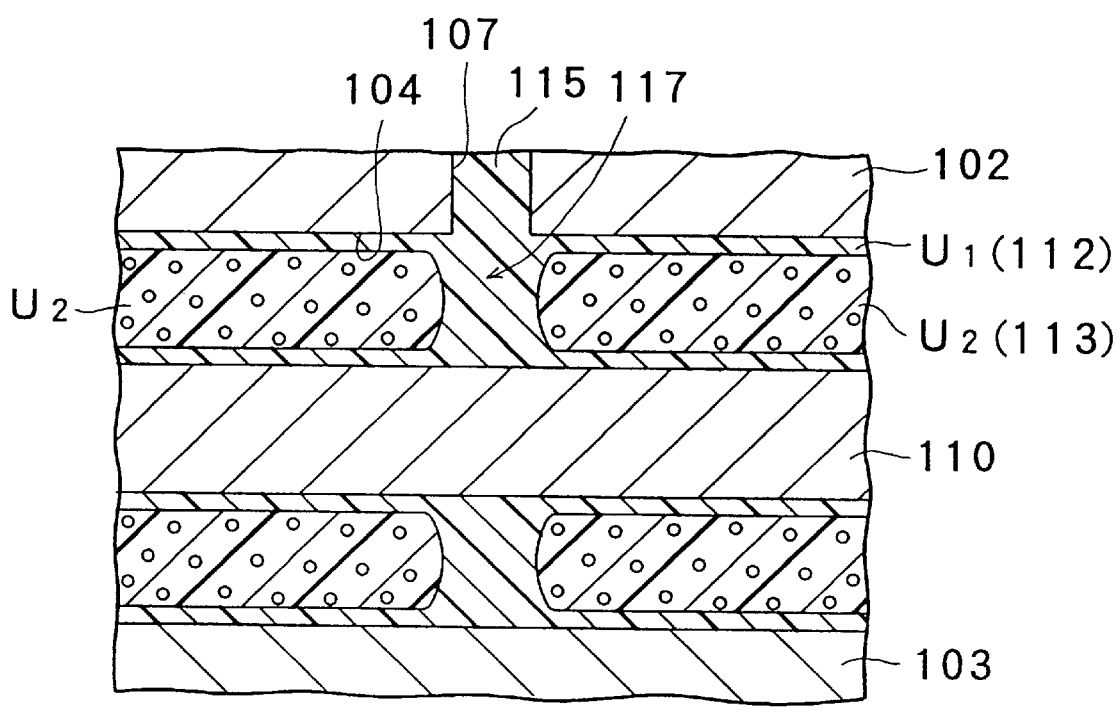
FIG. 48 is a sectional view showing the materials in the vicinity of a vent hole in the mold used in the known process.

Moreover, the product of the process embodying this invention is unlikely to lack uniformity in outside diameter and touch due to the surface-forming polyurethane material driven away by the streams of the inner-forming polyurethane material and gathering in the region below the vent hole, as has hitherto been the case as shown in FIG. 48.

Third Embodiment

Figure 16:
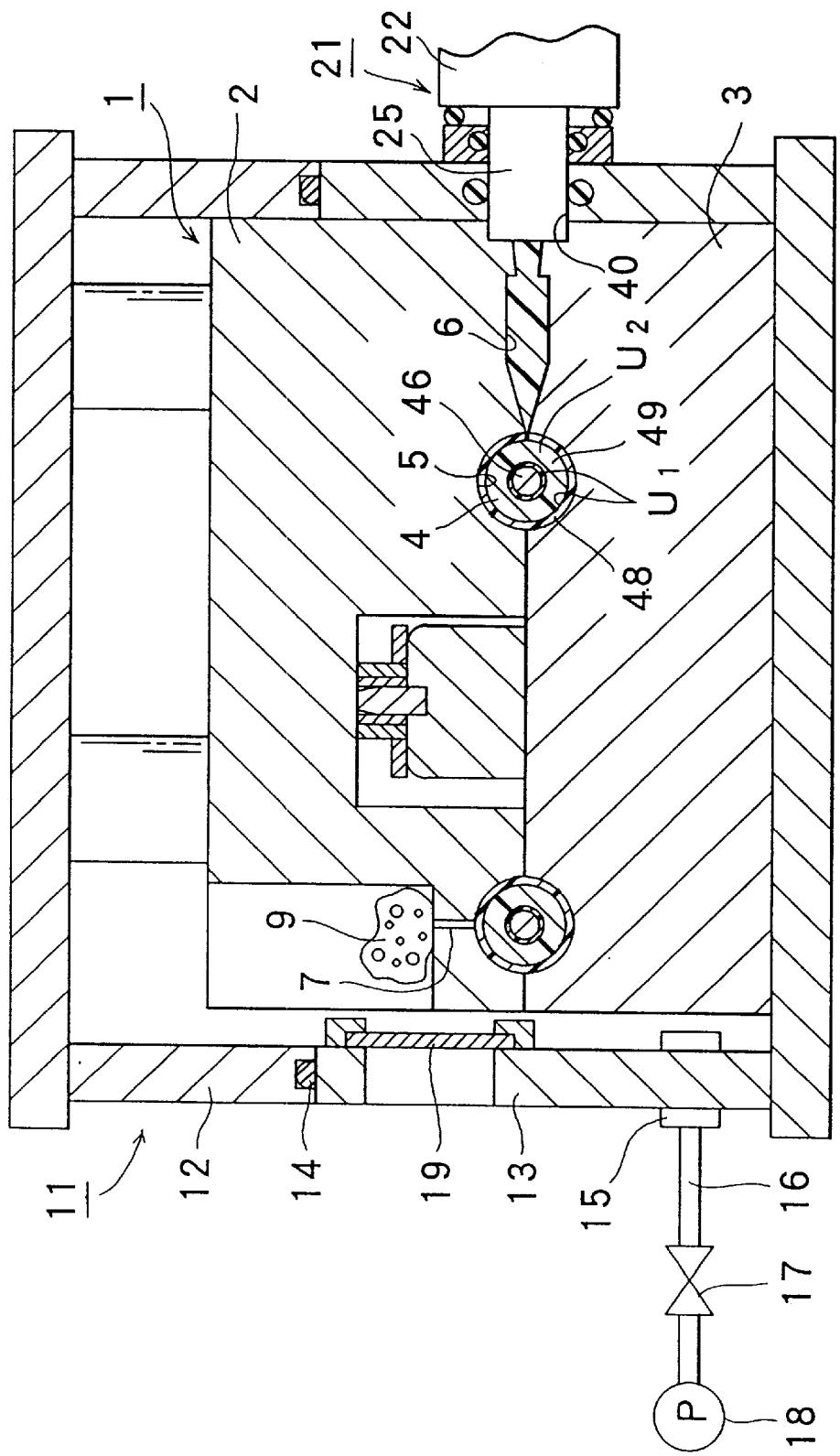
FIG. 16 is a sectional view showing the step of injecting an inner-forming material in a process according to a third embodiment of this invention.
Figure 17A:
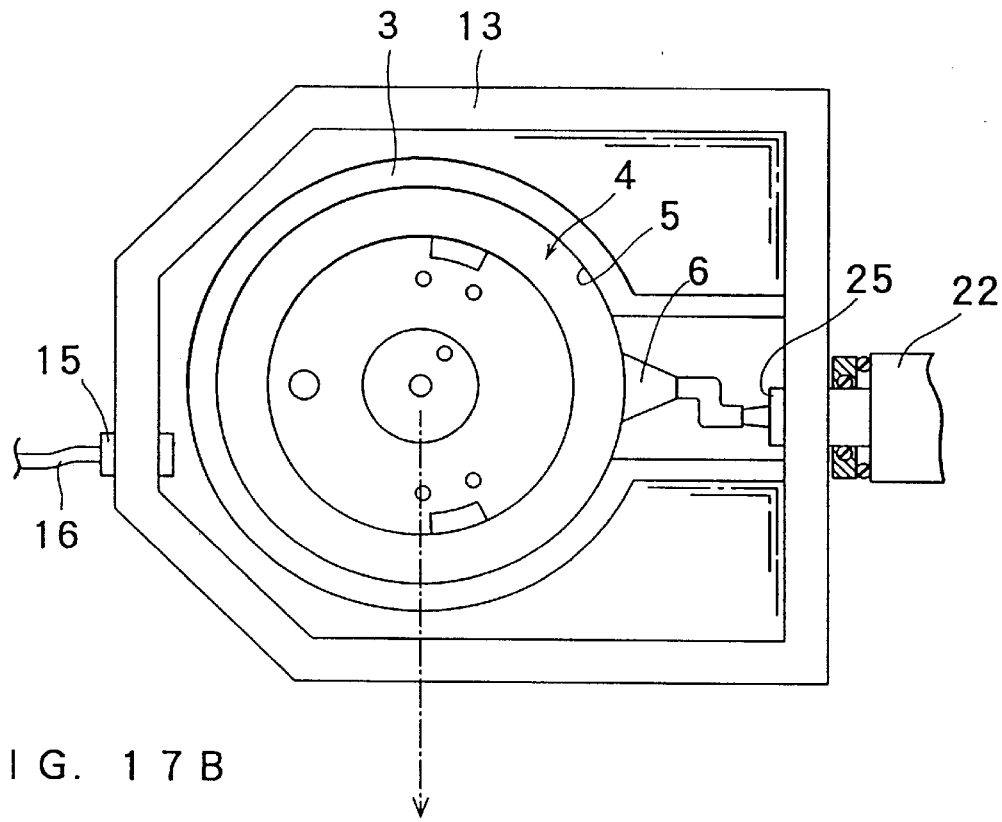
FIG. 17A is a top plan view of the lower mold portion in the same process.

FIGS. 16 to 18 show a third embodiment of this invention. This process is carried out by employing the same molding apparatus as employed by the process according to the first embodiment. The following is a stepwise description of the process employed for manufacturing a polyurethane covering 47 by RIM techniques:

(1) Equal to step (1) of the process according to the first embodiment.
(2) Equal to step (2) thereof.
(3) Equal to step (3) thereof (see FIG. 18).
(4) Step of injecting a surface-forming material which is equal to step (4) of the process according to the first embodiment.
(5) Intervening step:

The surface-forming polyurethane material U1 which has been injected is allowed to cure for a curing time (see FIG. 18). It does not need to be cured or harden completely, but may be allowed to be cured to an extent that it may not be reduced in thickness (or will not be carried away) by the streams of the inner-forming polyurethane material U2 when the inner-forming material is subsequently injected. Its curing time may be about 12 seconds. Its curing time can be shortened if the polyurethane material U1 has a higher rate of urethane reaction achieved by, for example, a catalyst added to its third component for promoting its urethane reaction. It is possible to raise the light resistance of the surface portion 48 if a non-yellowing material of high light resistance is used as the polyurethane material U1.

(6) Step of injecting an inner-forming material:

Step (5) of the process according to the first embodiment is followed for preparing an inner-forming polyurethane material U2 (see FIG. 18) and injecting it into the cavity 4 through the gate 6. An injection time of about 2.4 seconds may be used to inject a weight of about 360 g.

The polyurethane material U2 which has been injected forms an inner portion 49 comprising a highly foamed core and a lesser foamed self-skin layer, as when the process according to the first embodiment is employed. According to the process under description, however, the polyurethane material U2 fills the cavity 4 completely.

The surface portion 48 does not have its thickness reduced to an extent that would allow the inner portion 49 to be seen through even the part formed in the vicinity of gate 6. This is the case because of the intervening step, the surface portion 48 is sufficiently solid so as not to be carried away by the streams of the inner-forming polyurethane material U2.

Figure 17B:
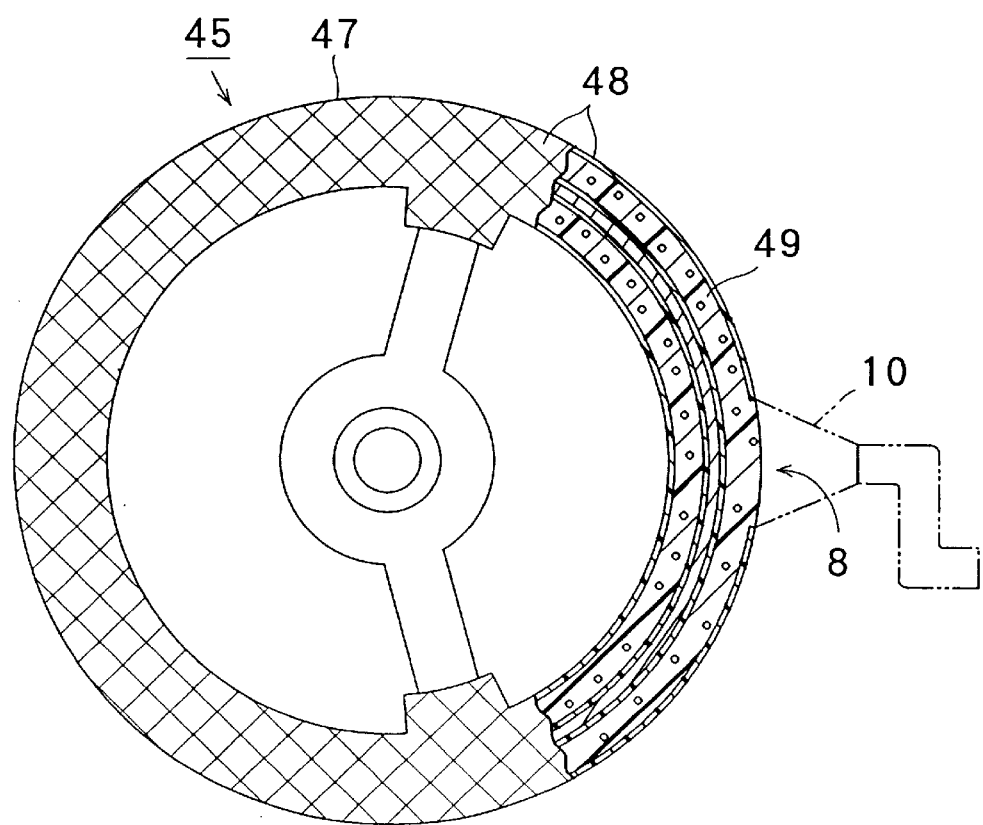
FIG. 17B is a top plan view, partly in section, of a molded product removed from the mold in the same process.

(7) Step of removing a molded product from the mold:

After all of the materials U1 and U2 have been allowed to cure, step (7) of the process according to the first embodiment is followed for opening the mold and removing therefrom a steering wheel 45 having a polyurethane covering 47 as shown in FIG. 17B. If the gate burr 10 is cut off, the inner portion 49 composed of the colorless polyurethane material U2 is exposed in a cut section 8, and the cut section 8 has, therefore, to be painted.

The intervening step, however, enables the surface portion 48 to resist any undesirable reduction in thickness, as stated above, and thereby makes it possible to obtain favorable results which are similar to those attained by the process according to the second embodiment.

Fourth Embodiment

Figure 19:
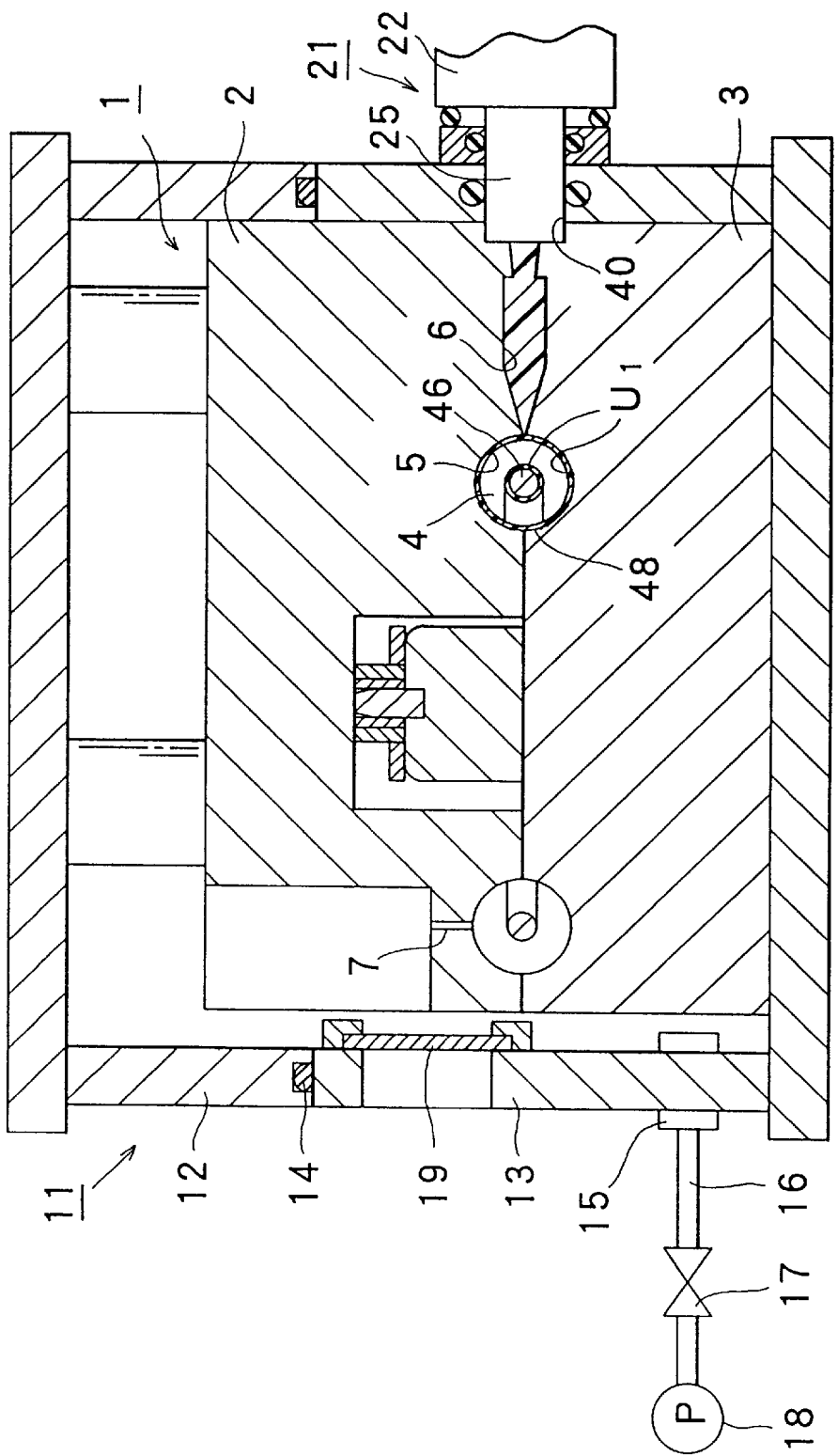
FIG. 19 is a sectional view showing the first injection step of a surface-forming material in a process according to a fourth embodiment of this invention.
Figure 23:
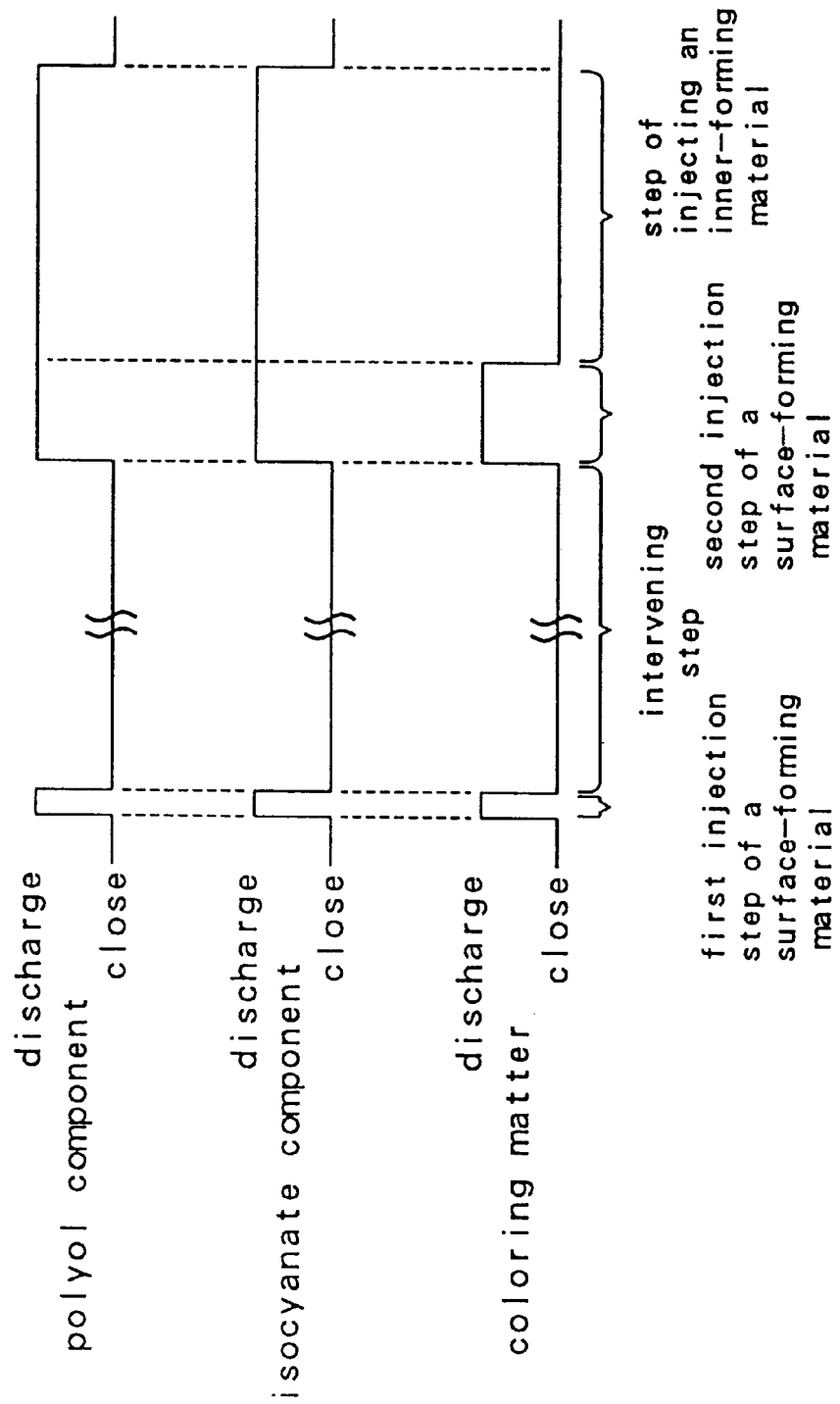
FIG. 23 is a chart showing the timing for changing the material to be injected in the same process.

FIGS. 19 to 23 show a fourth embodiment of this invention. This process differs from the process according to the third embodiment in that the step of injecting a surface-forming material is divided into two steps and an intervening step exists therebetween. The following is a stepwise description of the process:

(1) Equal to step (1) of the process according to the first embodiment.
(2) Equal to step (2) thereof.
(3) Equal to step (3) thereof.
(4) First injection step of a surface-forming material:

Step (4) of the process according to the first embodiment is followed for preparing a surface-forming polyurethane material U1 (see FIG. 23). A small amount of polyurethane material U1 is injected through the gate 6 into the cavity 4 having a reduced pressure, as shown in FIG. 19. An injection time of about 0.2 second may be spent to inject a weight of about 30 g.

Figure 20:
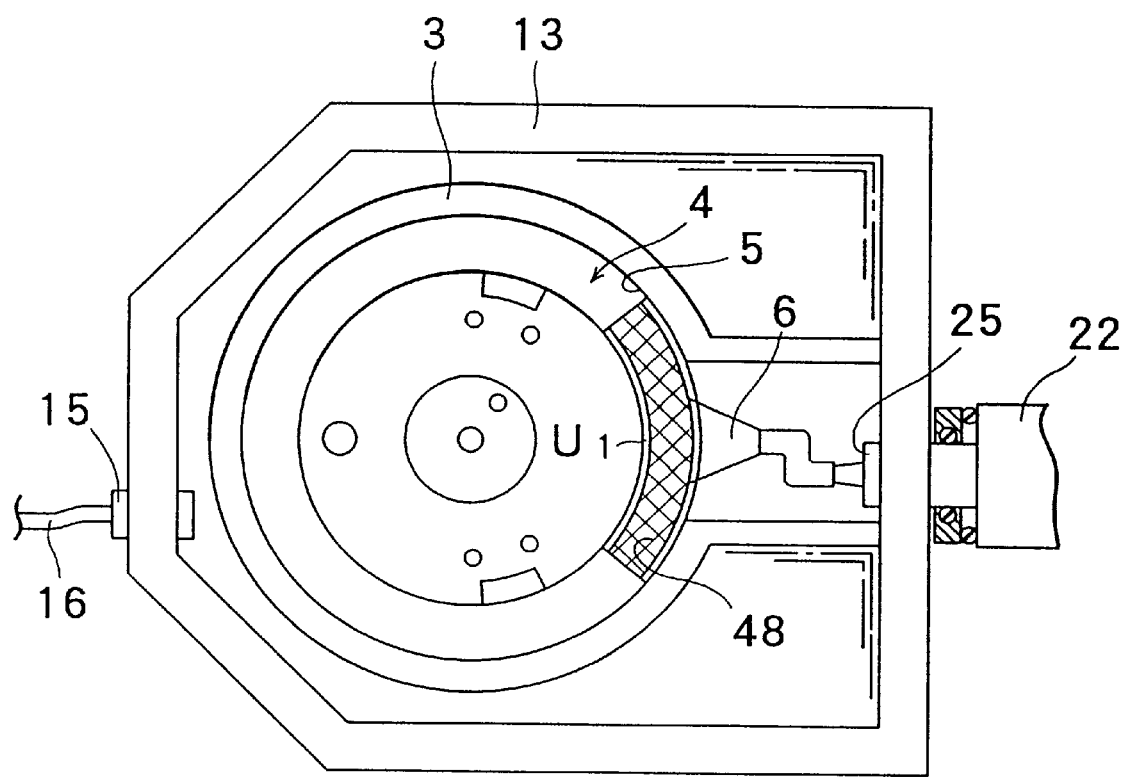
FIG. 20 is a top plan view of the lower portion of the mold shown in FIG. 19.

The polyurethane material U1 which has been injected scatters in the cavity 4 and adheres to the cavity walls 5 in the vicinity of the gate 6 as a film forming the surface portion 48 of a polyurethane covering only in the vicinity of the gate 6. The lower mold portion 3 at this stage of operation is shown in FIG. 20 (in which no metal core is shown).

Figure 21:
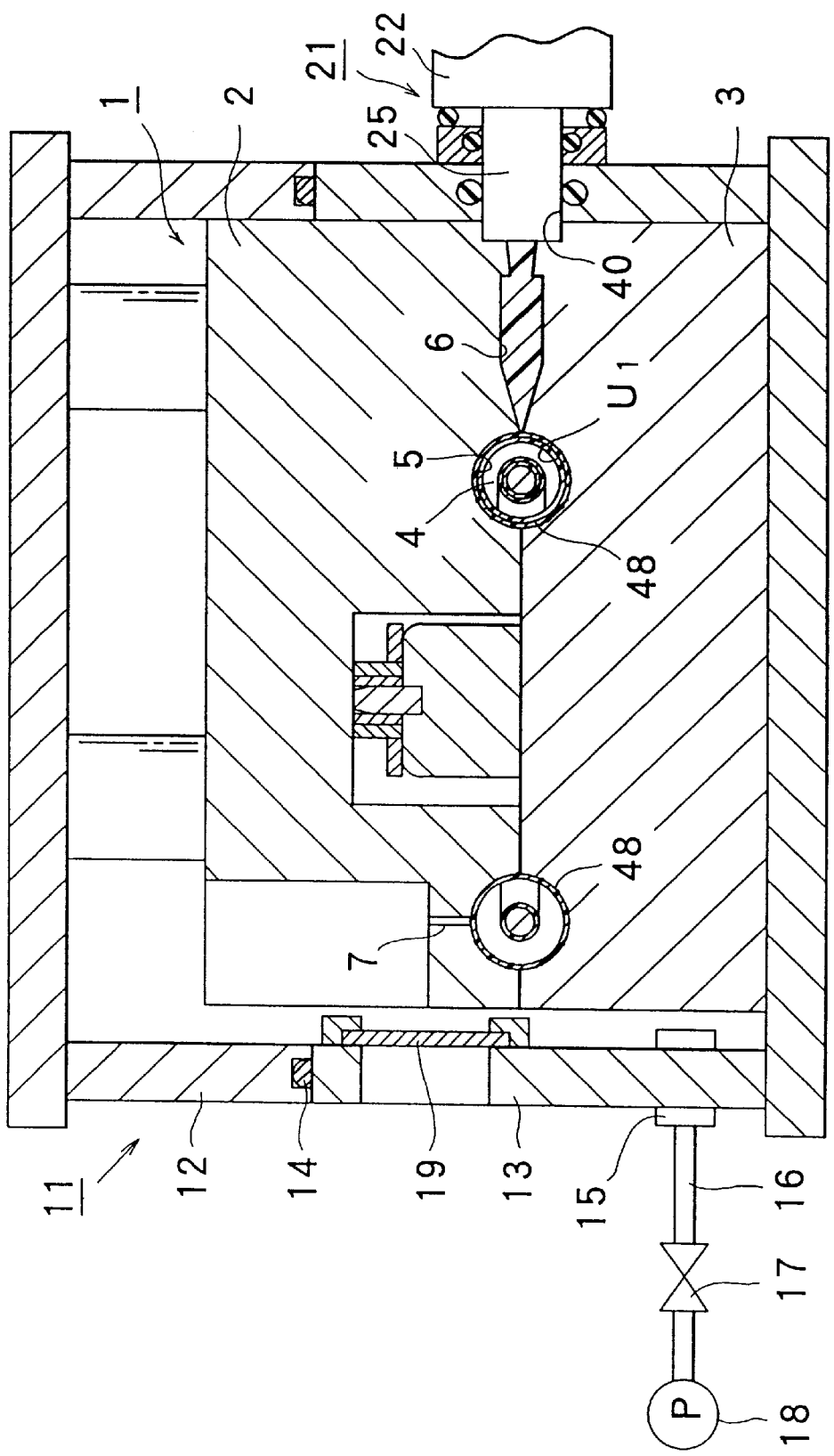
FIG. 21 is a sectional view showing the second injection step of a surface-forming material in the same process.

(5) An intervening step is employed equal to step (5) of the process according to the third embodiment (see FIG. 23).
(6) Second injection step of a surface-forming material:

To accomplish the second injection, the first injection step of the surface-forming material is repeated for preparing a surface-forming polyurethane material U1 (see FIG. 23). The surface-forming polyurethane material U1, which is the same as that used for the first injection step of the surface-forming material, is injected through the gate 6 into the cavity 4 which is maintained at a reduced pressure, as shown in FIG. 21. An injection time of about 0.8 second may be spent to inject a weight of about 120 g.

Figure 22:
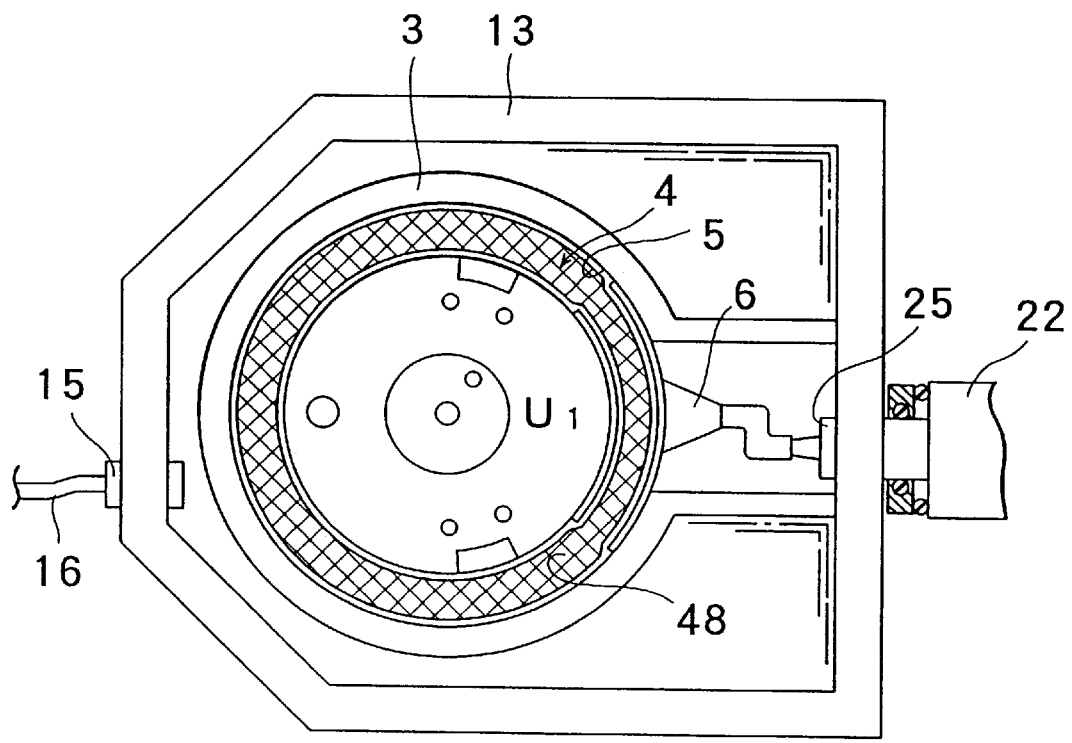
FIG. 22 is a top plan view of the lower mold portion shown in FIG. 21.

The polyurethane material U1 which has been injected scatters in the cavity 4 and adheres to substantially the whole surface of cavity walls 5 as a film forming the surface portion 48 of the polyurethane covering. The lower mold portion 3 at this stage of operation is shown in FIG. 22 (in which no metal core is shown). The surface portion 48 formed in the vicinity of the gate 6 has a larger thickness than the rest thereof after the first and second injection steps of the surface-forming polyurethane material U1.

(7) Step of injecting an inner-forming material:

This step is equal to step (6) of the process according to the third embodiment (see FIG. 23). The surface-forming polyurethane material U1, which was injected during the second injection step of a surface-forming material and is adhering to the cavity walls 5, is not hard as yet, so it may be carried away to some extent by the streams of the inner-forming polyurethane material U2. However, the surface-forming polyurethane material U1 injected during the first injection step of the surface-forming material will have cured to the extent that it will not be reduced in thickness by the subsequent injection of the inner-forming polyurethane material by the time the inner-forming material is injected, so it is not carried away.

(8) Step of removing a molded product from the mold:

This step is equal to step (7) of the process according to the first embodiment.

The surface portion 48 formed by the process embodying this invention has a greater thickness in the vicinity of the gate 6, where it is most likely to be affected by the inner-forming polyurethane material U2 immediately after its injection, than anywhere else, and the surface portion 48 formed in the vicinity of the gate 6 is, therefore, still more unlikely to have an undesirably small thickness.

Fifth Embodiment

Figure 24:
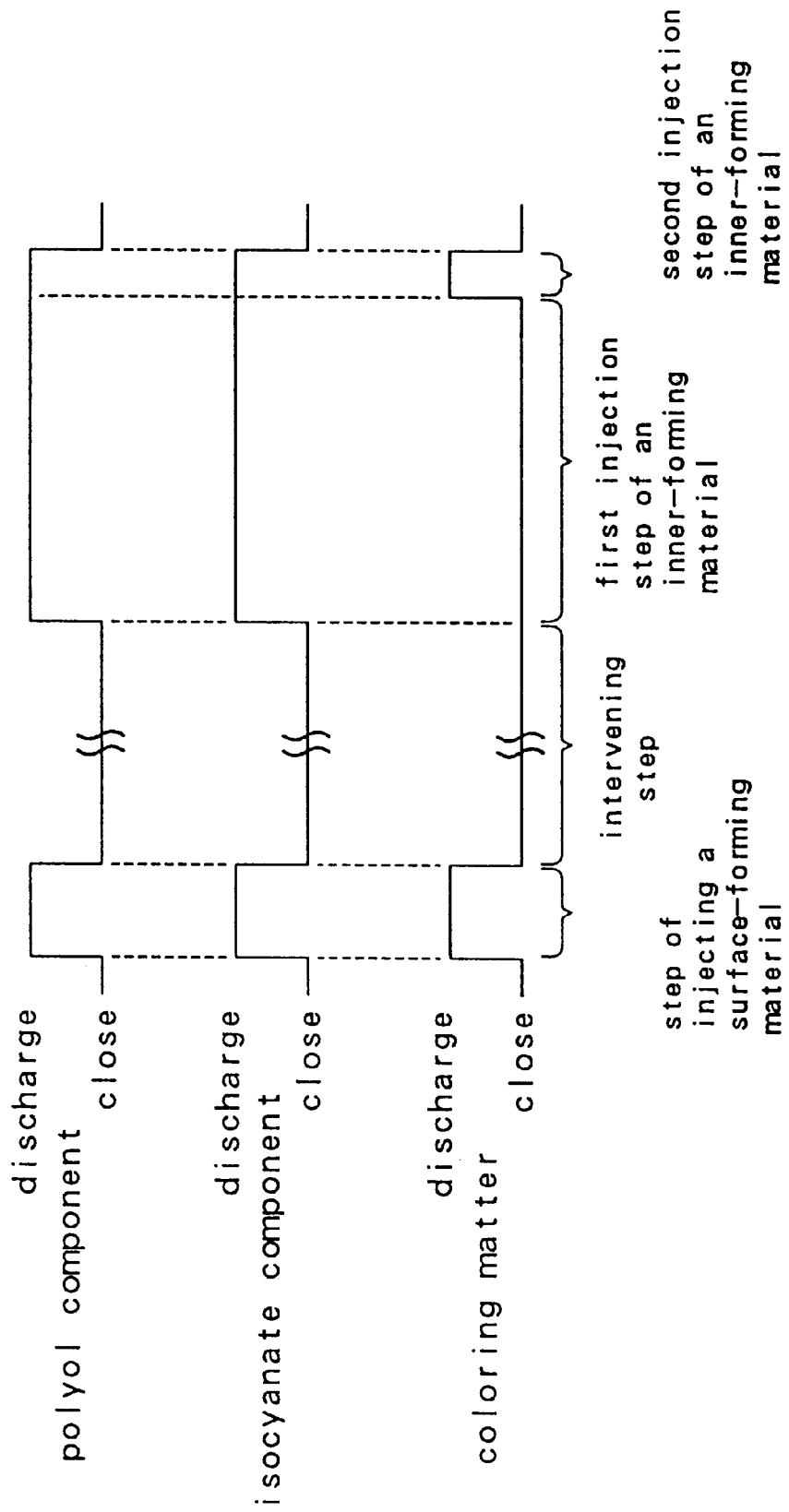
FIG. 24 is a chart showing the timing for changing the material to be injected in a process according to a fifth embodiment of this invention.

FIG. 24 shows a timing diagram for a fifth embodiment of this invention. This process is a combination of the processes according to the first and third embodiments, wherein an intervening step is employed between the steps of injecting surface-forming and inner-forming materials, and the step of injecting an inner-forming material is divided into two steps. The following is a stepwise description of the process:
(1) Equal to step (1) of the process according to the first embodiment.
(2) Equal to step (2) thereof.
(3) Equal to step (3) thereof.
(4) Step of injecting a surface-forming material: Equal to step (4) thereof.
(5) Intervening step: Equal to step (5) of the process according to the third embodiment.
(6) First injection step of an inner-forming material: Equal to step (5) of the process according to the first embodiment.
(7) Second injection step of an inner-forming material: Equal to step (6) thereof.
(8) Step of removing a molded product from the mold: Equal to step (7) thereof.

Sixth Embodiment

Figure 25:
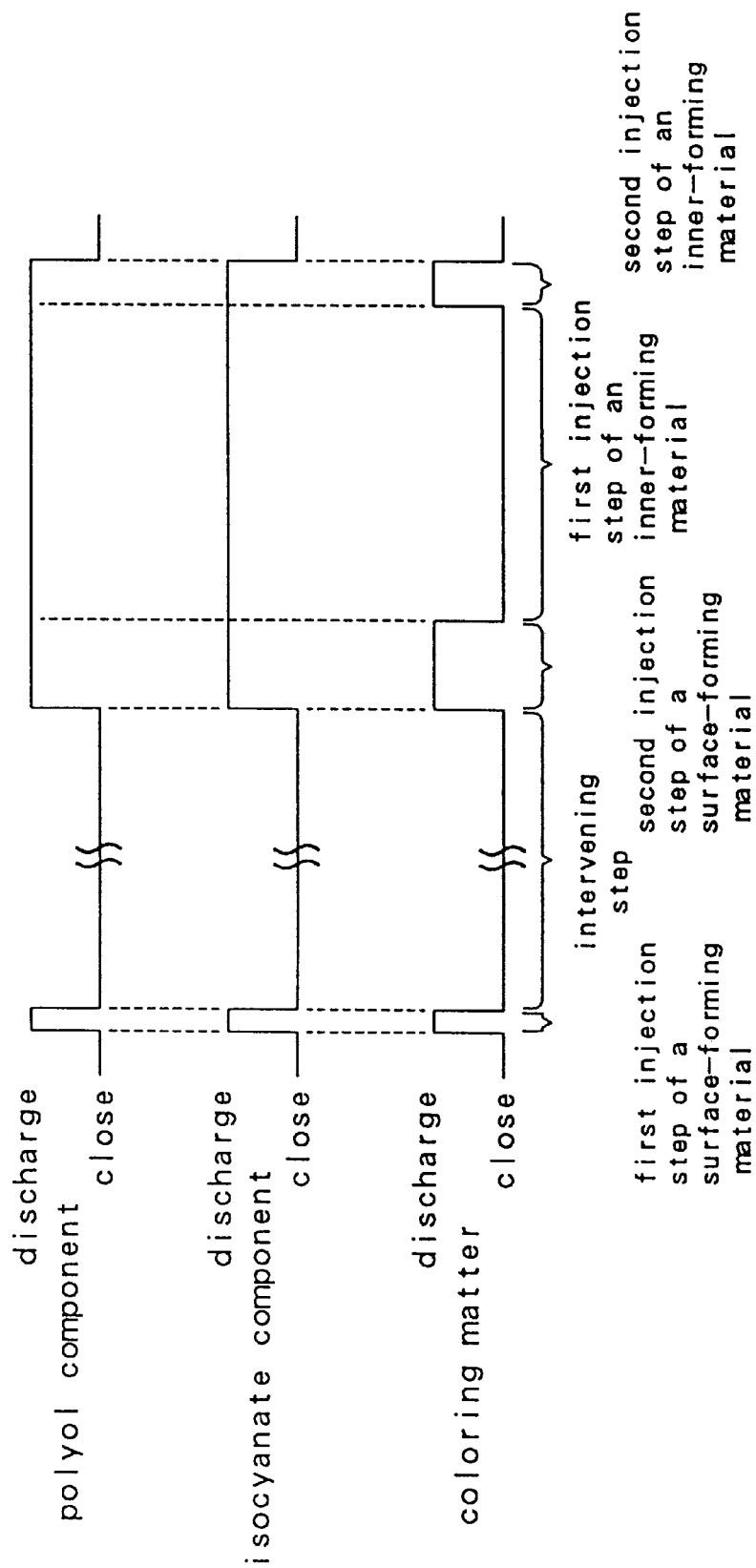
FIG. 25 is a chart showing the timing for changing the material to be injected in a process according to a sixth embodiment of this invention.

FIG. 25 shows a timing diagram for a sixth embodiment of this invention. This process is a combination of the processes according to the first and fourth embodiments (wherein the step of injecting a surface-forming material is divided into two steps, an intervening step exists therebetween, and the step of injecting an inner-forming material is divided into two steps). The following is a stepwise description of the process:
(1) Equal to step (1) of the process according to the first embodiment.
(2) Equal to step (2) thereof.
(3) Equal to step (3) thereof.
(4) First injection step of a surface-forming material: Equal to step (4) of the process according to the fourth embodiment.
(5) Intervening step: Equal to step (5) thereof.
(6) Second injection step of a surface-forming material: Equal to step (6) thereof.
(7) First injection step of an inner-forming material: Equal to step (5) of the process according to the first embodiment.
(8) Second injection step of an inner-forming material: Equal to step (6) thereof.
(9) Step of removing a molded product from the mold: Equal to step (7) thereof.

Seventh Embodiment

Figure 26:
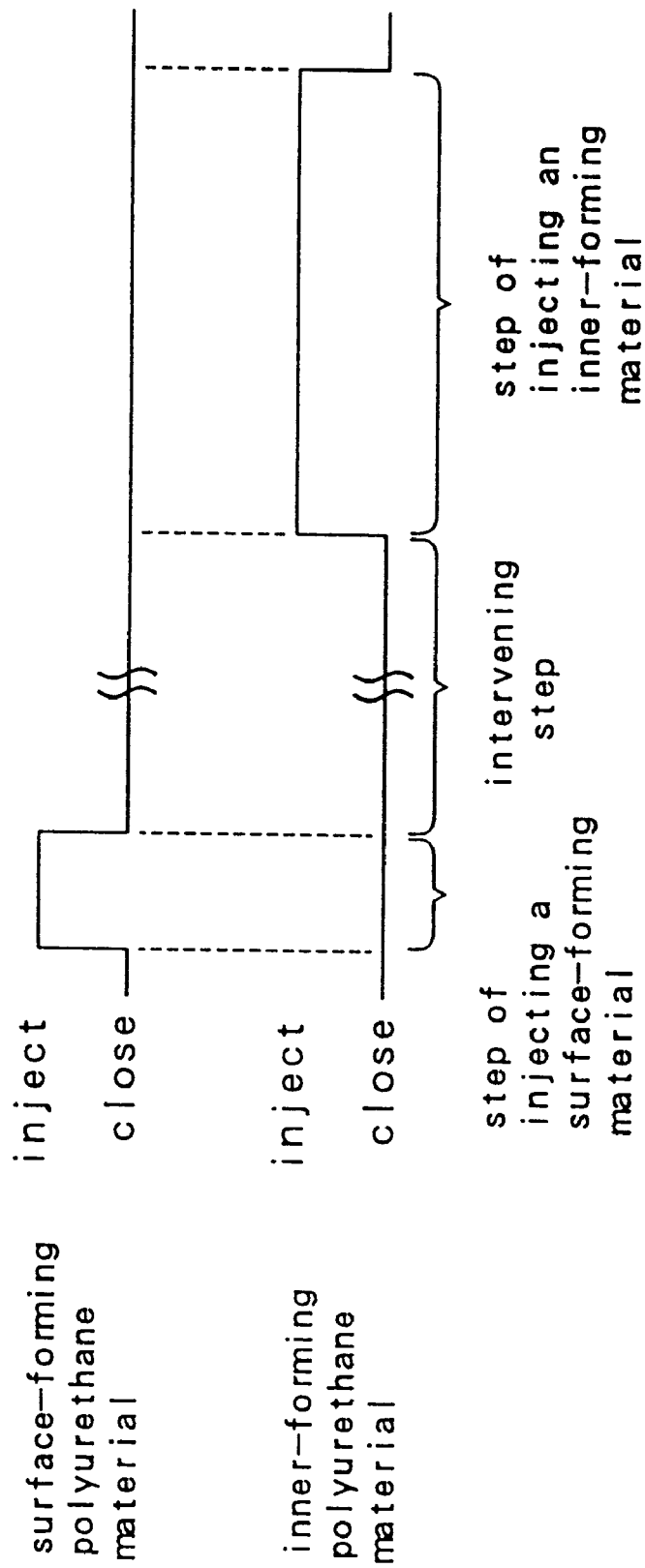
FIG. 26 is a chart showing the timing for changing the material to be injected in a process according to a seventh embodiment of this invention.
Figure 28A:
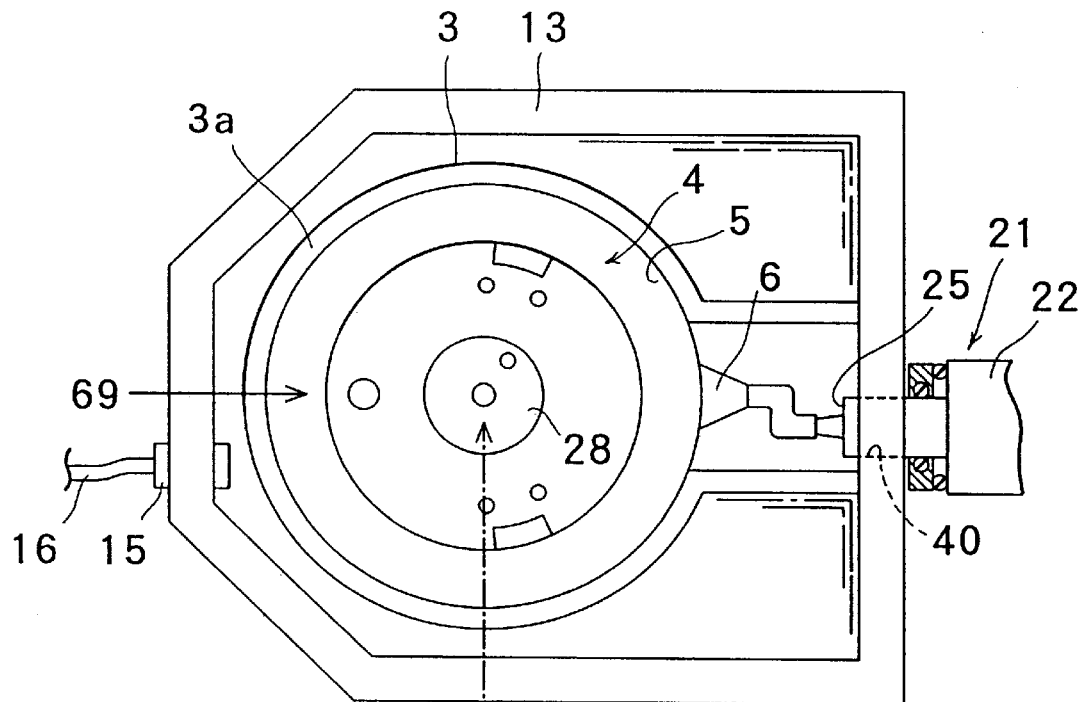
FIG. 28A is a top plan view of a lower mold portion in a process according to a ninth embodiment of this invention.
Figure 28B:
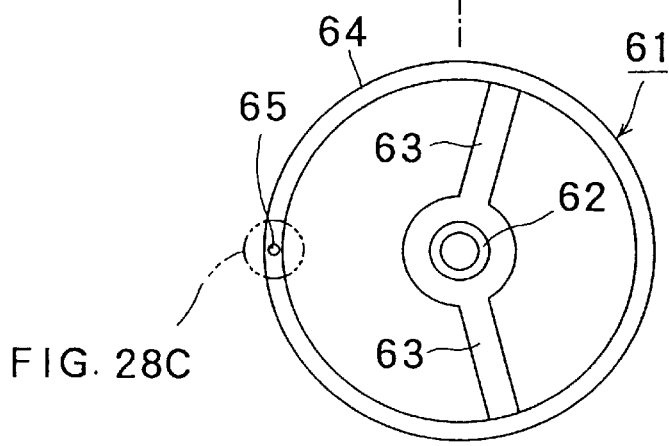
FIG. 28B is a top plan view of a metal core being set in the mold in the same process.
Figure 28C:
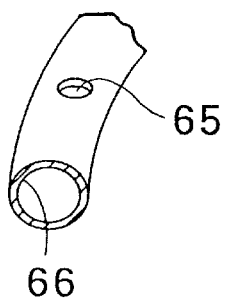
FIG. 28C is a fragmentary perspective view of the metal core in the same process.

FIG. 26 shows a timing diagram for a seventh embodiment of this invention. This process is identical to the process according to the third embodiment, except that it employs a six-component mixing head 20 as employed by the process according to the second embodiment (see FIG. 13). The following is a stepwise description of the process:
(1) Equal to step (1) of the process according to the first embodiment.
(2) Equal to step (2) thereof.
(3) Equal to step (3) thereof.
(4) Step of injecting a surface-forming material: Equal to step (4) of the process according to the second embodiment.
(5) Intervening step: Equal to step (5) of the process according to the third embodiment, though a curing time of about 10 seconds may be sufficient for the surface-forming polyurethane material U1 employed by the process under description, insofar as it contains a catalyst for promoting its urethane reaction promptly after its adherence to the cavity walls.
(6) Step of injecting an inner-forming material: Equal to step (5) of the process according to the second embodiment.
(7) Step of removing a molded product from the mold: Equal to step (7) of the process according to the first embodiment.

Eighth Embodiment

FIG. 27 shows a timing diagram for an eighth embodiment of this invention. This process differs from the seventh embodiment only in that the step of injecting a surface-forming material is divided into two steps and an intervening step exists therebetween.
In other words, it is a combination of the fourth and seventh embodiments. For any further details, therefore, reference is made to the descriptions of those two embodiments.

Ninth embodiment

Attention is now directed to FIGS. 28A to 37 showing a ninth embodiment of this invention. This process is applied to a steering wheel having a metal core 61, shown in FIG. 28B as being comprised of a central boss 62 in cylindrical block form, two plate- or rod-shaped spokes 63 extending radially from boss 62 and a hollow tubular ring 64 connected to the outer ends of the spokes 63. The shape and number of each of those parts are variable if any such variation is appropriate. The ring 64 has an open hole 65, shown in FIG. 29, formed in its wall and is positioned in the mold to be located diametrically opposite gate 6 when the ring 64 is set in a cavity 4, as will be described in detail hereafter. The diameter, shape and number of such an open hole 65 are variable.

Figure 29:
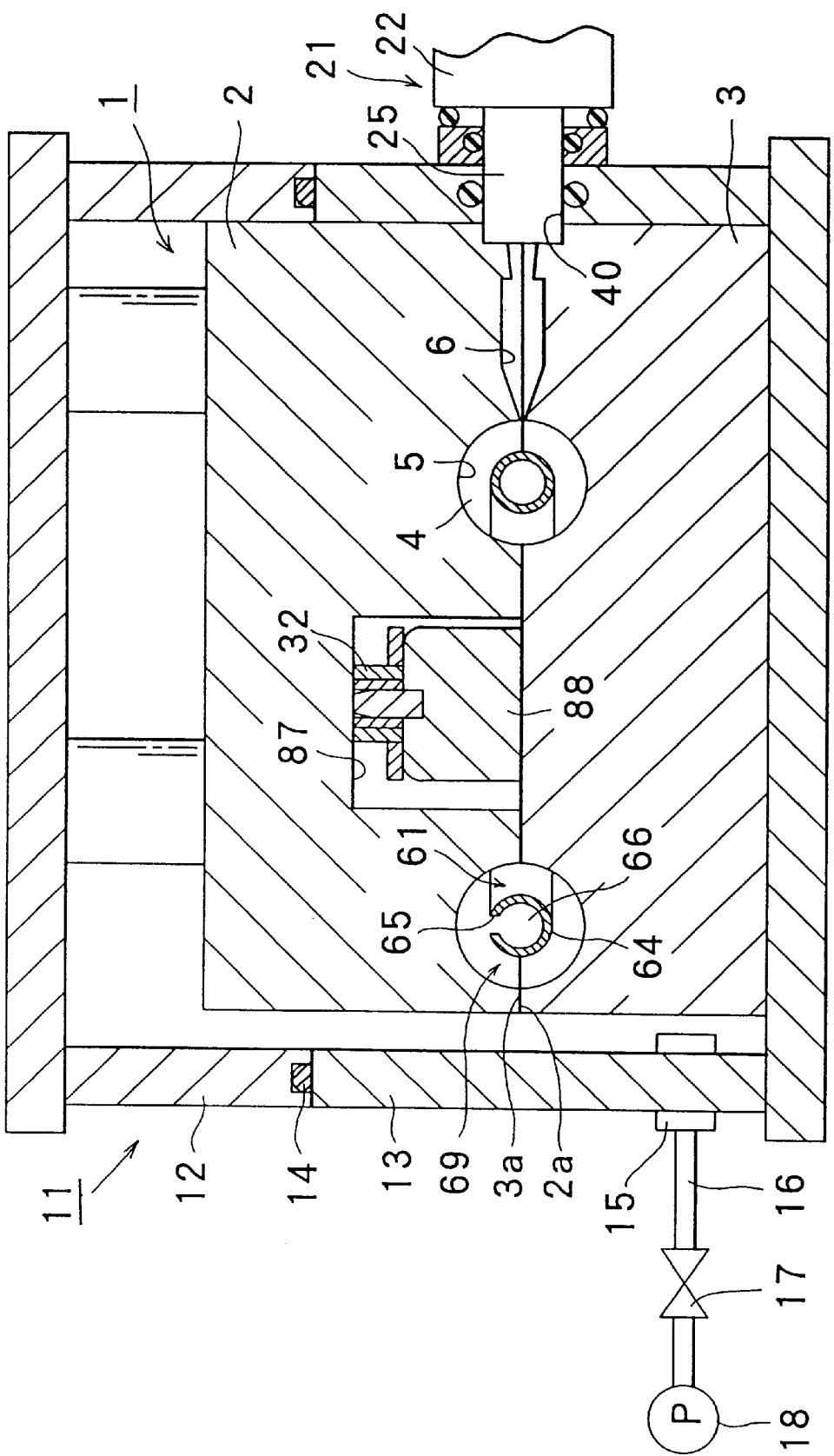
FIG. 29 is a sectional view of the upper and lower mold portions joined together in the same process.

The process is carried out by employing a molding apparatus which is substantially identical to that employed by the process according to the first embodiment, except that the upper mold portion 2 has no vent hole 7, and the vacuum casing 11 has no window 19. The upper mold portion 2 has a recess 87 formed near its center for holding the boss 62, while the lower mold portion 3 has a stand 88 situated near its center for supporting the boss 62, as shown in FIG. 29.

Figure 37:
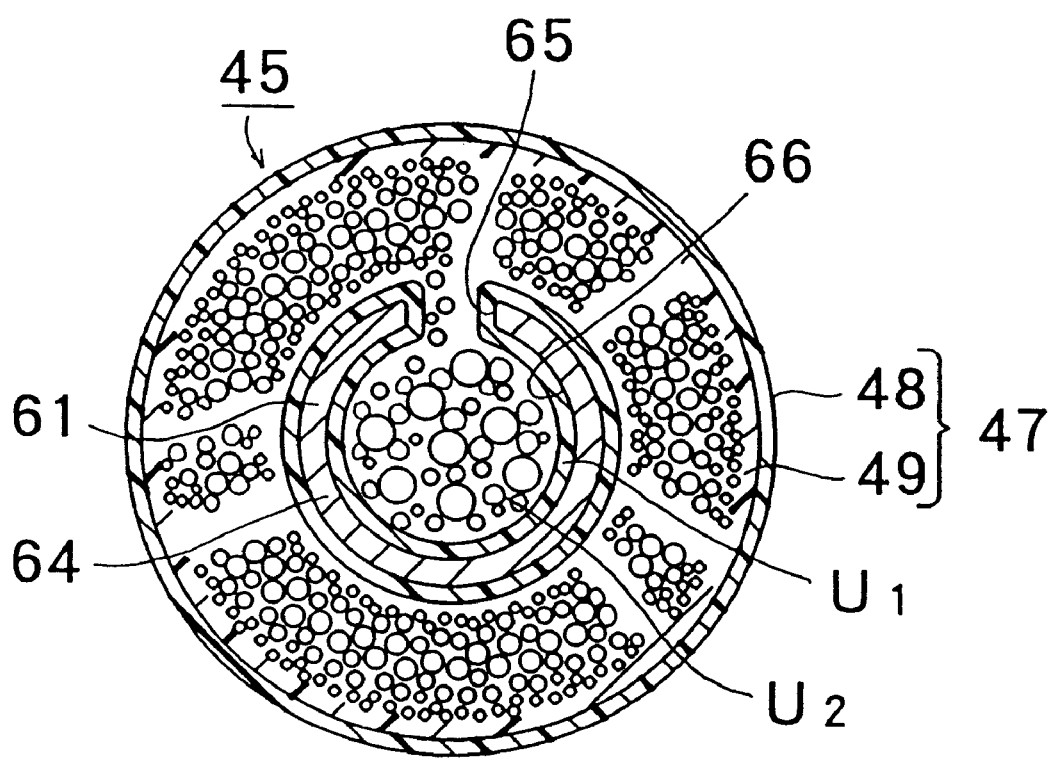
FIG. 37 is a sectional view taken along the line XXXVII—XXXVII of FIG. 36B.

The following is a stepwise description of the process which is carried out for making a polyurethane covering 47 as in FIG. 37 for the metal core 61 by RIM by employing the apparatus as described above:
(1) Equal to step (1) of the process according to the first embodiment.
(2) While step (2) of the process according to the first embodiment is repeated for setting the metal core 61 on the lower mold portion 3 with its ring 64 surrounded by the cavity wall 5, it is necessary to position the open hole 65 in a final filling portion 69 diametrically opposite gate 6, as is obvious from FIG. 28A. Then, the upper and lower mold portions 2 and 3 are joined together to form the cavity 4, while the upper and lower casing portions 12 and 13 are joined together to close the vacuum casing 11 tightly, as shown in FIG. 29.

(3) While step (3) of the process according to the first embodiment is repeated for evacuating the vacuum casing 11 to an appropriate vacuum degree by the vacuum pump 18, the hollow interior 66 of the ring 64 is evacuated through its open hole 65, while the cavity 4 is evacuated through the clearance between the mating surfaces 2a and 3a of the two mold portions, as the upper mold portion 2 has no vent hole 7. The vacuum degree is variable within an appropriate range.

Figure 30:
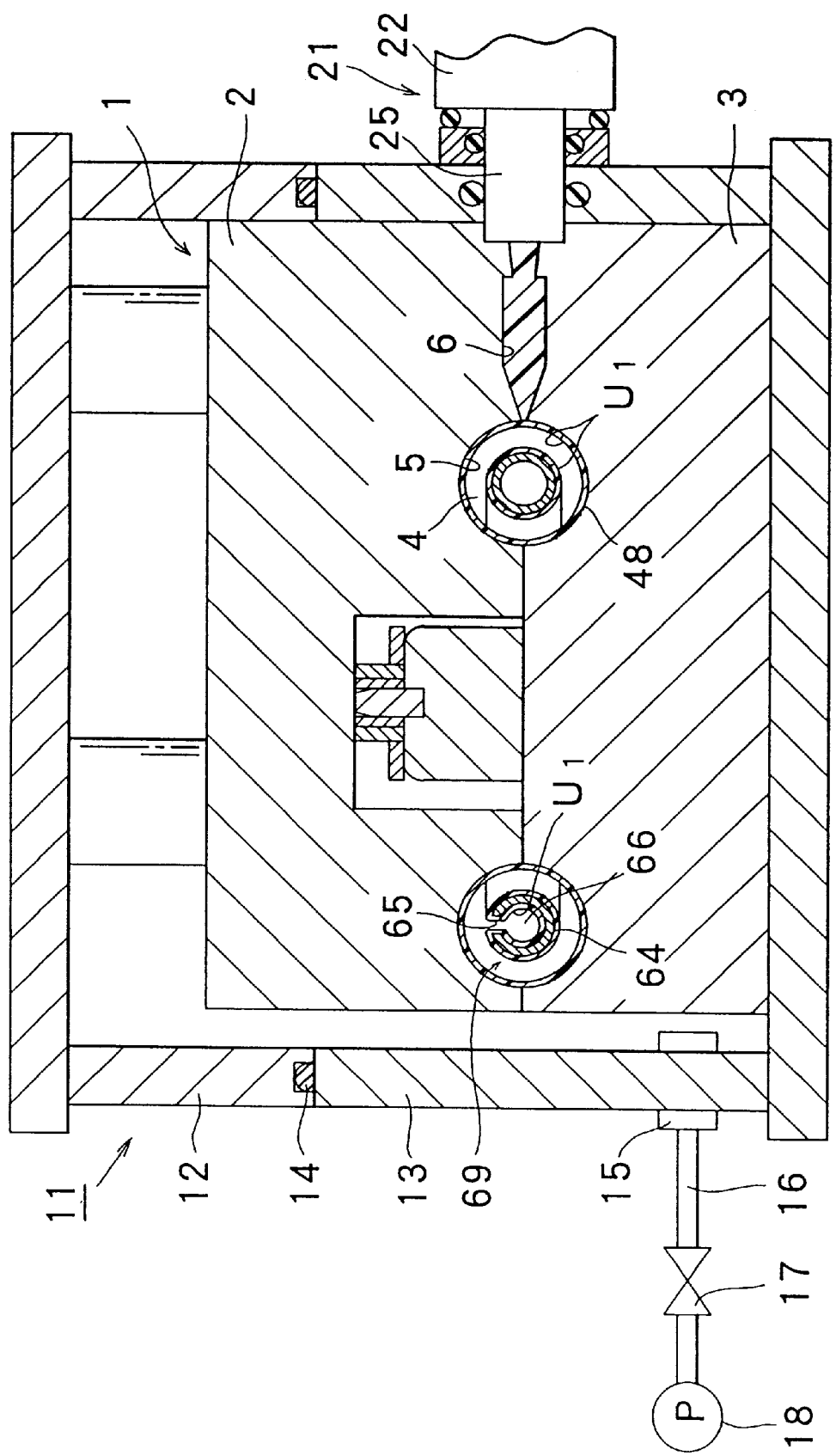
FIG. 30 is a sectional view showing the step of injecting a surface-forming material in the same process.

(4) Step of injecting a surface-forming material:

Step (4) of the process according to the first embodiment is repeated for injecting a surface-forming polyurethane material U1 into the cavity 4, as shown in FIG. 30.

Figure 31:
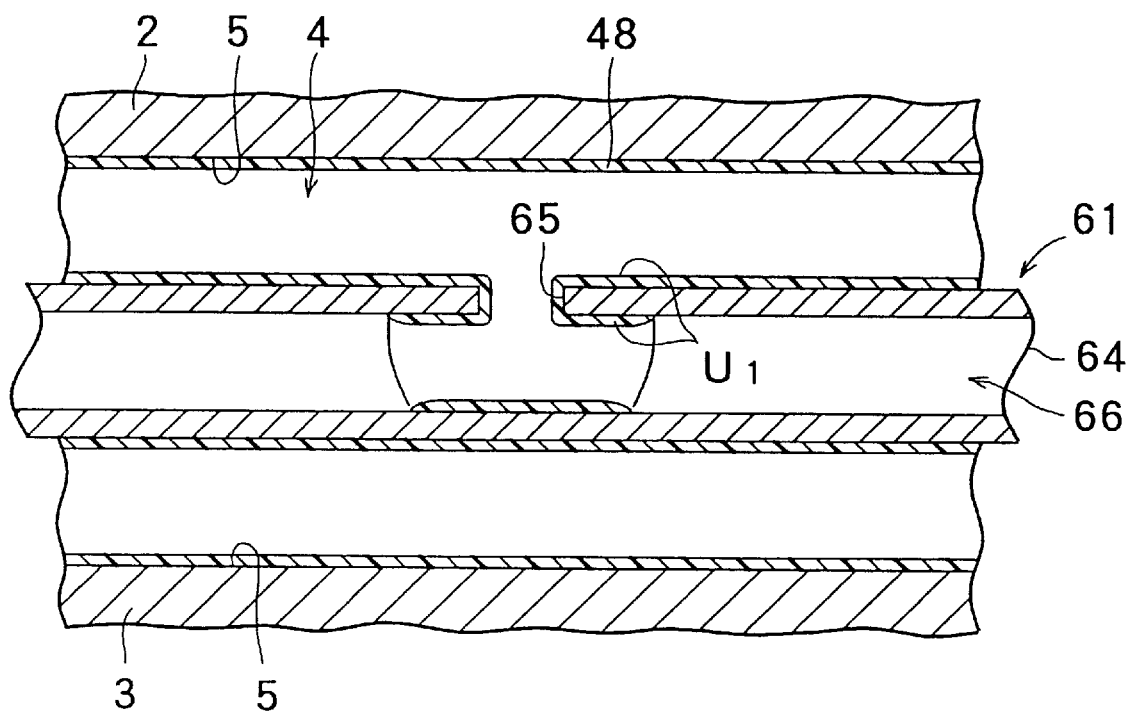
FIG. 31 is a sectional view showing the material in the vicinity of an open hole in the metal core shown in FIG. 30.

While the polyurethane material U1 which has been injected adheres to substantially the whole surfaces of the cavity walls 5 as a film forming the surface portion 48 of a polyurethane covering 47, it also adheres to substantially the whole outer surface of the ring 64, and a small amount of material enters its hollow interior 66, which has a reduced pressure drawn through open hole 65, and adheres to its inner surface, as shown in FIG. 31. The polyurethane material U1 can be one having a high rate of urethane reaction, or a non-yellowing one of high light resistance.

Figure 32:
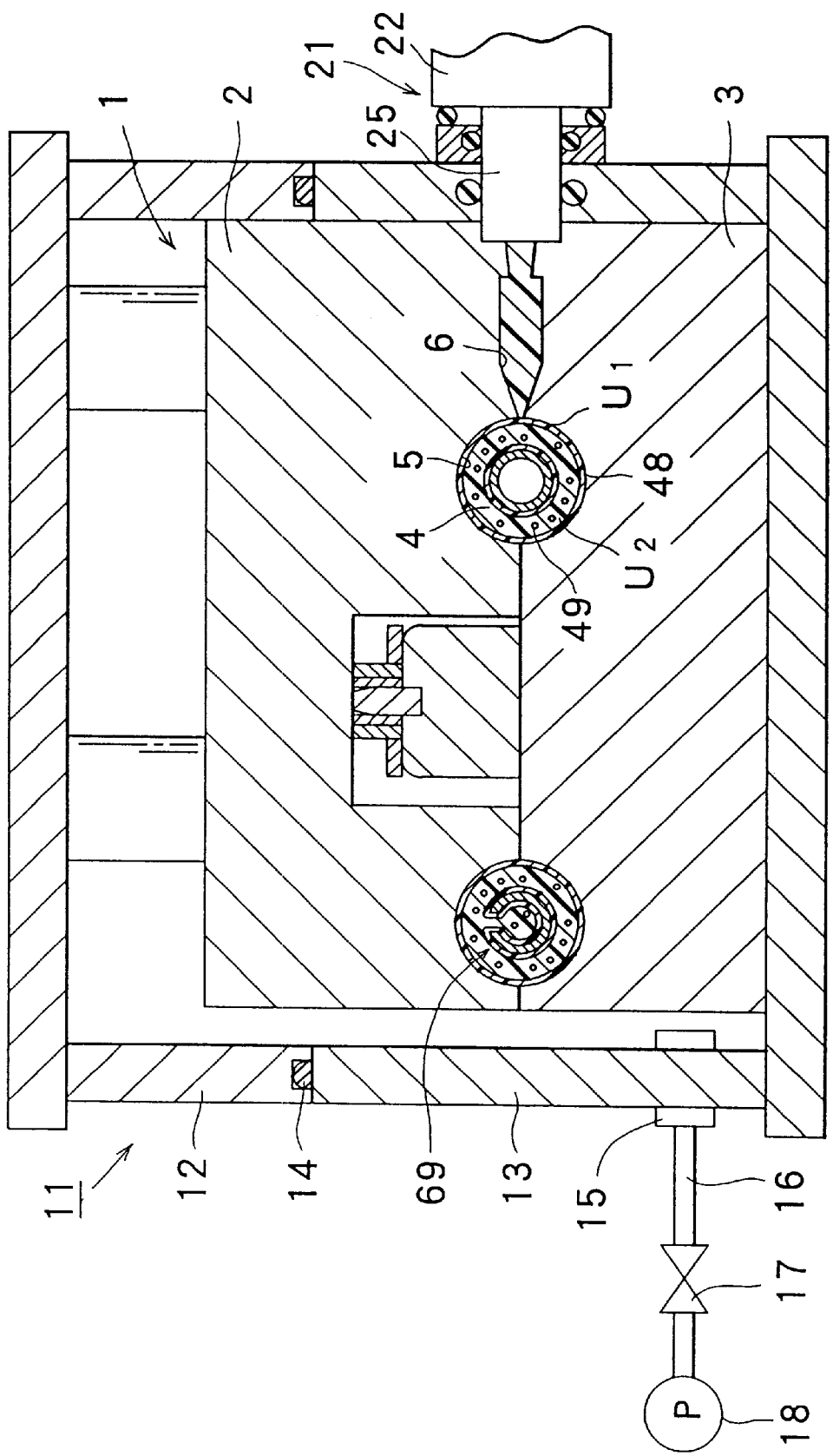
FIG. 32 is a sectional view showing the step of injecting an inner-forming material in the same process.

(5) Step of injecting an inner-forming material:

Step (5) of the process according to the first embodiment is repeated for injecting an inner-forming polyurethane material U2 into the cavity 4 through the same gate 6 (or another gate formed in a different location), as shown in FIG. 32.

The polyurethane material U2 which has been injected forms the inner portion 49 of the polyurethane covering 47, shown in FIG. 37.

Figure 33:
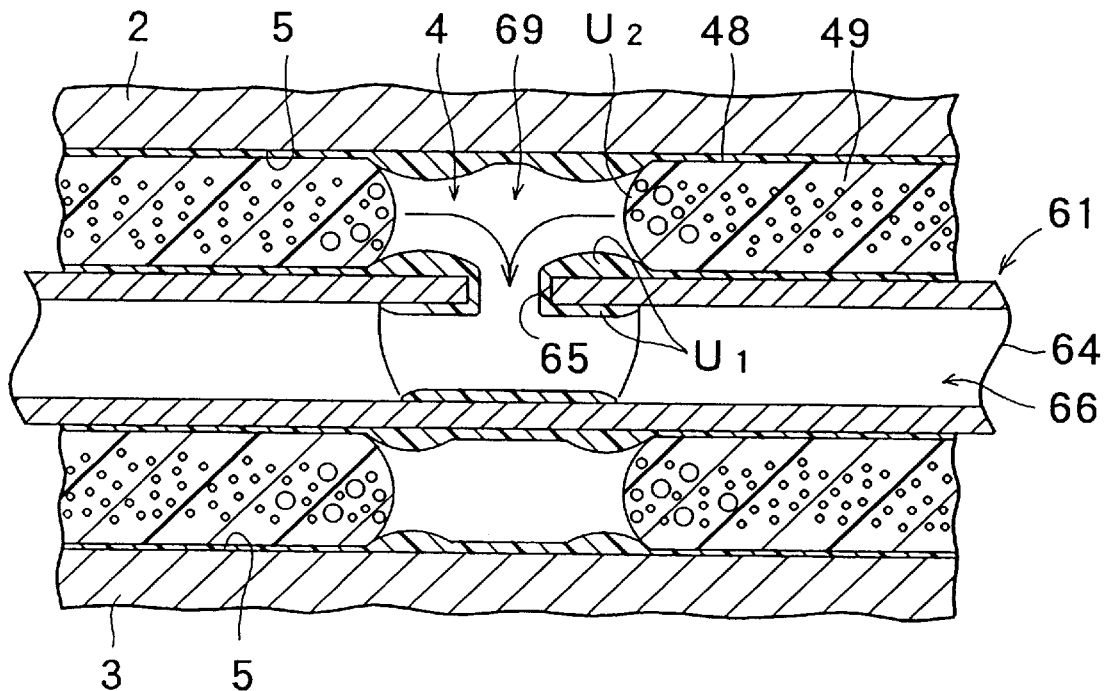
FIG. 33 is a sectional view showing the materials in the vicinity of the open hole in the metal core shown in FIG. 32.
Figure 34:
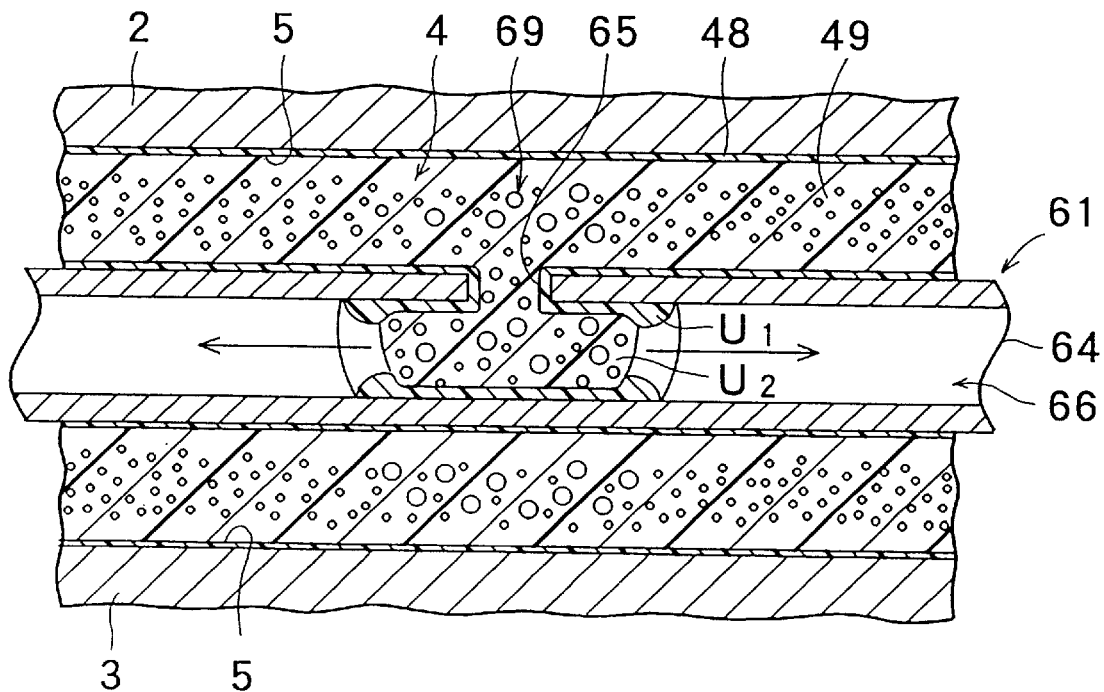
FIG. 34 is a sectional view showing the materials in the vicinity of the open hole in the metal core at a later stage.
Figure 35:
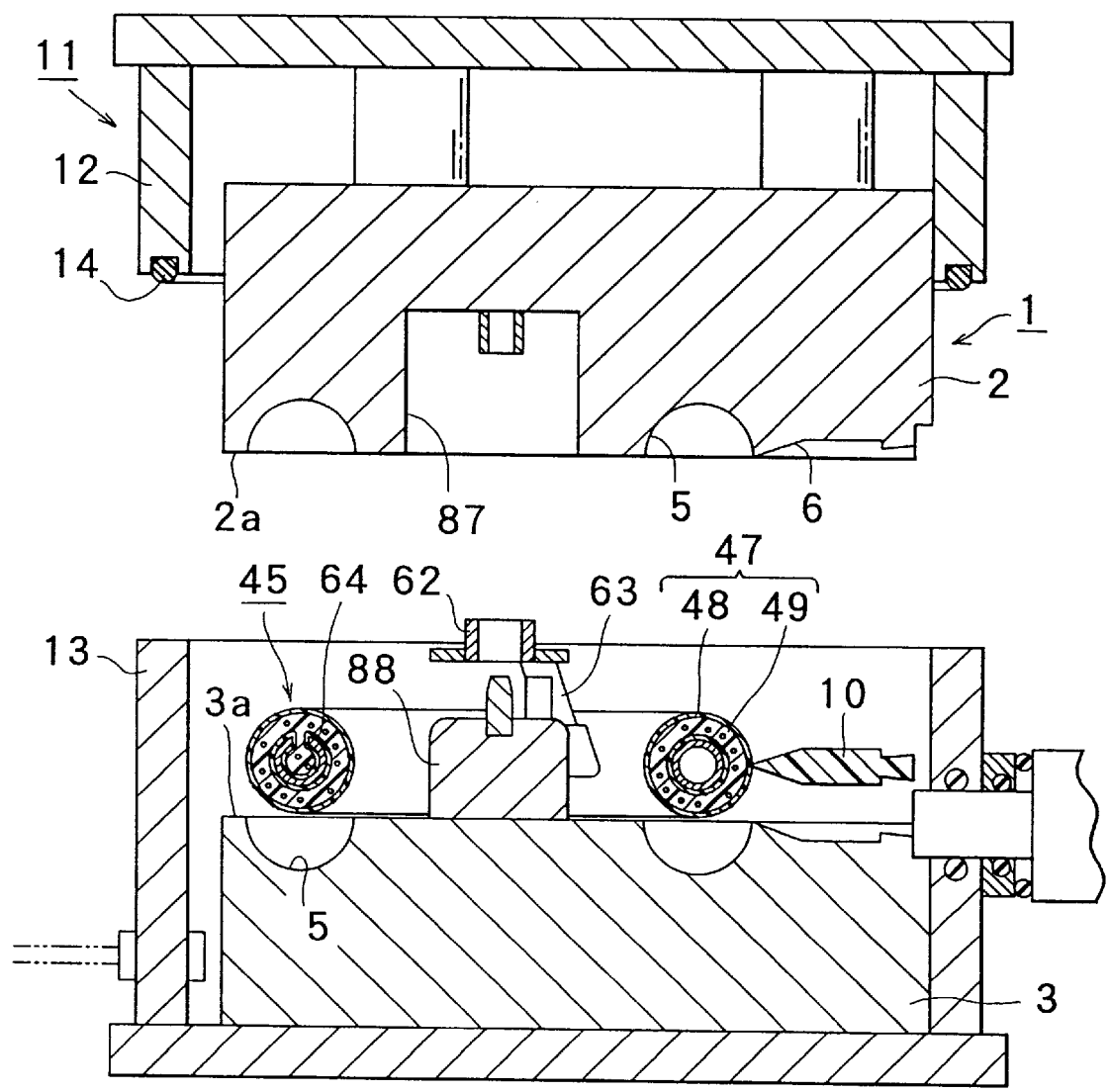
FIG. 35 is a sectional view showing the step of removing a molded product from the mold in the same process.
Figure 36A:
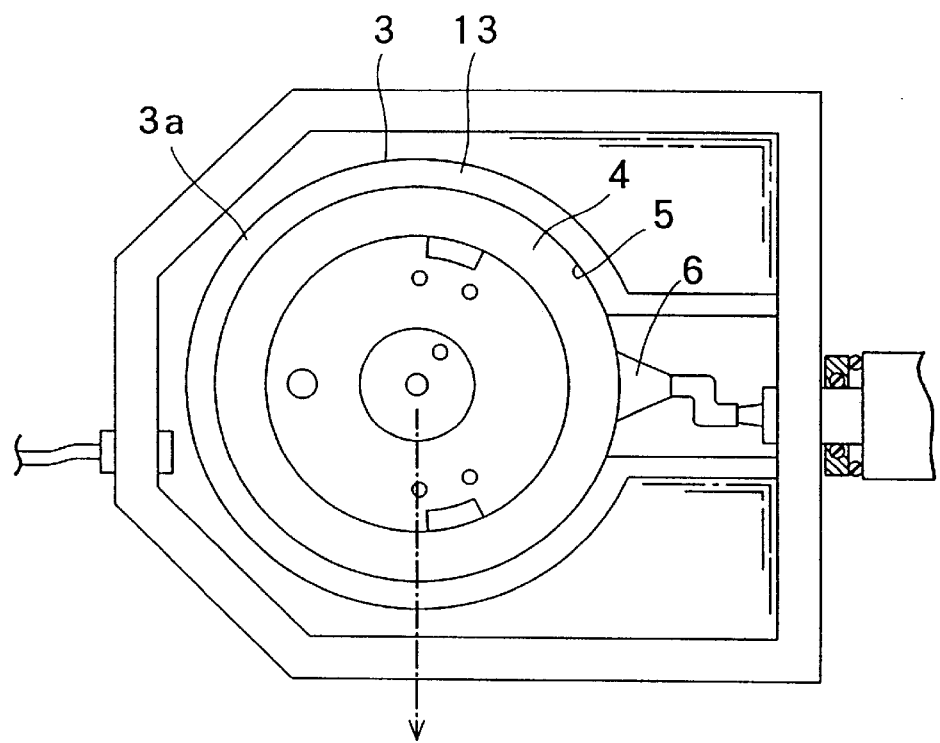
FIG. 36A is a top plan view of the lower mold portion shown in FIG. 35.
Figure 36B:
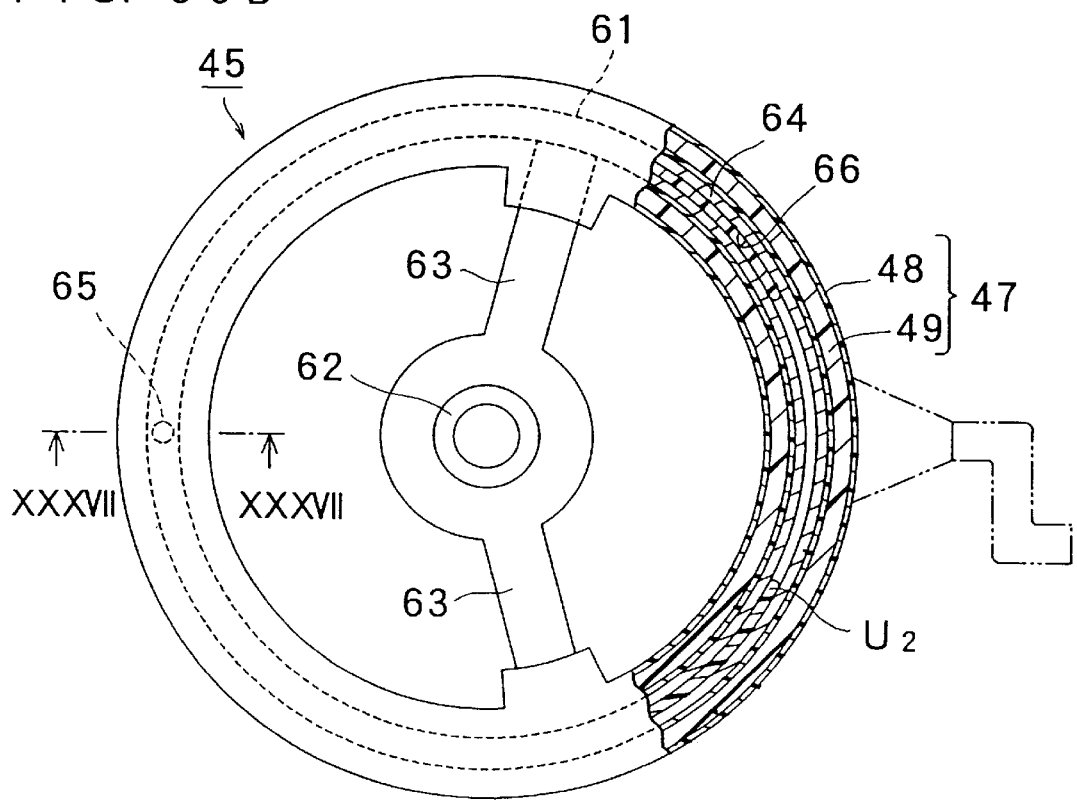
FIG. 36B is a top plan view, partly in section, of the molded product removed from the mold shown in FIG. 35.

The surface-forming polyurethane material U1 adhering to the cavity walls 5 is carried away from the surface portion 48 to some extent by the inner-forming polyurethane material U2 which has been injected. The polyurethane material U1 which has been so carried away is driven by the leading ends of streams of the polyurethane material U2 flowing in two directions along the cavity 4, and gathers in the final filling portion 69, and enters the hollow interior 66 of the ring 64 through its open hole 65, as shown in FIGS. 33, 34 and 37. The leading ends of the streams of the polyurethane material U2, which contain an excess of bubbles, also flow into the hollow interior 66 through the open hole 65.

As the hollow interior 66 of the ring 64 has a reduced pressure, there exists a pressure difference which promotes the flow of the polyurethane materials U1 and U2 thereinto by suction, and the continuation of such flow does not readily bring about an elevated pressure in the ring 64. Therefore, its hollow interior 66 admits sufficiently large amounts of the materials U1 and U2 such that the gathering mass of the surface-forming polyurethane material U1 and the leading ends of streams of the inner-forming polyurethane material U2 which are likely to form pinholes may not stay in the final filling portion 69, but may completely flow into the hollow interior 66. Thus, there is obtained a molded product which is uniform in its outside diameter and touch, since every part thereof is uniform in shrinkage and hardness, whether it may have been formed in the final filling portion 69, or anywhere else. It also has a good outward appearance, since it has no pinholes, or like defects.

If the polyurethane material U2 fills the greater part of the hollow interior 66 (see FIG. 36B), it has an elevated pressure and ceases to admit any more material.

(6) Step of removing a molded product from the mold: Equal to step (7) of the process according to the first embodiment (see FIGS. 35 and 36A and B).

The process as described enables the manufacture of a molded product of polyurethanes by RIM in a mold 1 having no vent hole (of the ventless type), and eliminates any and all jobs associated with use of a mold having a vent hole (such as supplying the vent hole with a mold release agent, removing an outflow, and cutting off a vent-hole burr), and thereby makes it possible to reduce work steps, achieve an improved cycle of molding operation and obtain a molded product improved in both its outward appearance and touch.

Tenth Embodiment

FIGS. 38A to 41 show a tenth embodiment of this invention. This process differs from the ninth embodiment in the position of the open hole 65 and in that the hollow interior 66 of the ring 64 is evacuated through a support pin, too.

Figure 38A:
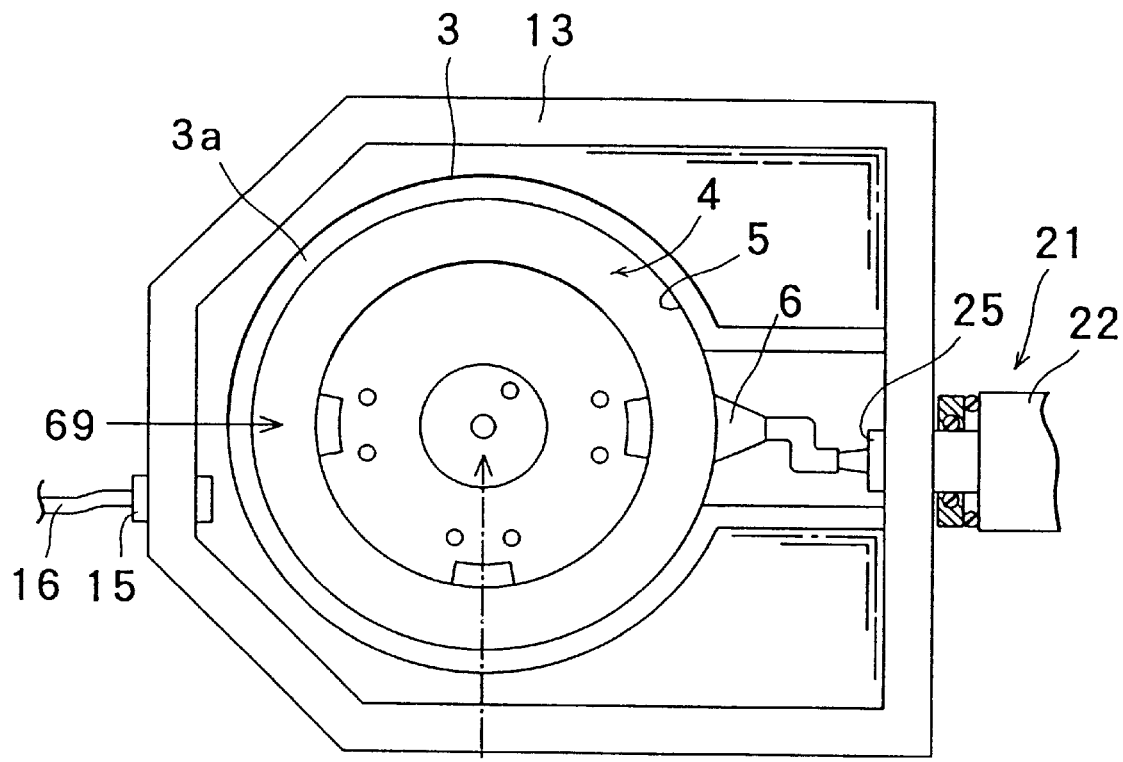
FIG. 38A is a top plan view of a lower mold portion in a process according to a tenth embodiment of this invention.
Figure 38B:
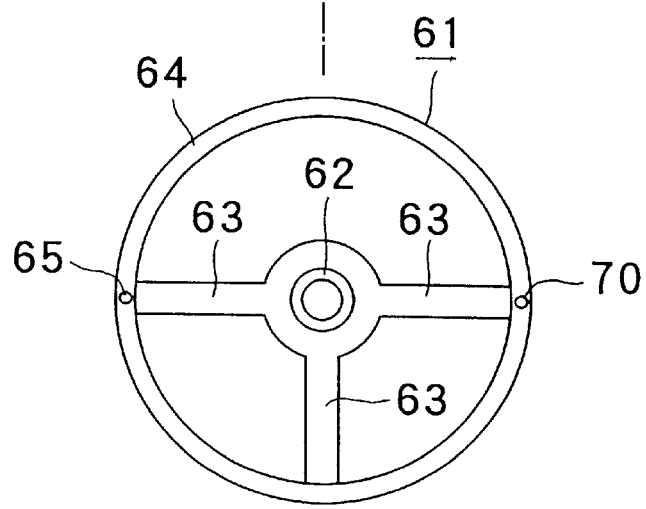
FIG. 38B is a metal core being set in the mold in the same process.

This process is shown as being applied to a metal core 61, as shown in FIG. 38B, having three spokes 63 arranged in a T-shaped array, and its ring 64 has an open hole 65 formed adjacent to the outer end of the left spoke 63. The ring 64 also has a second suction hole 70 formed adjacent to the outer end of the right spoke 63. The second suction hole 70 is used for connecting a support pin 77, as will be described below in detail in connection with FIGS. 40A and 40B. The open holes 65 and the suction hole 70 do not appreciably lower the strength of the ring 64, since they are formed in portions supported and reinforced by the spokes 63. The diameters, shapes and number of the holes 65 and 70 are appropriately variable.

Figure 39:
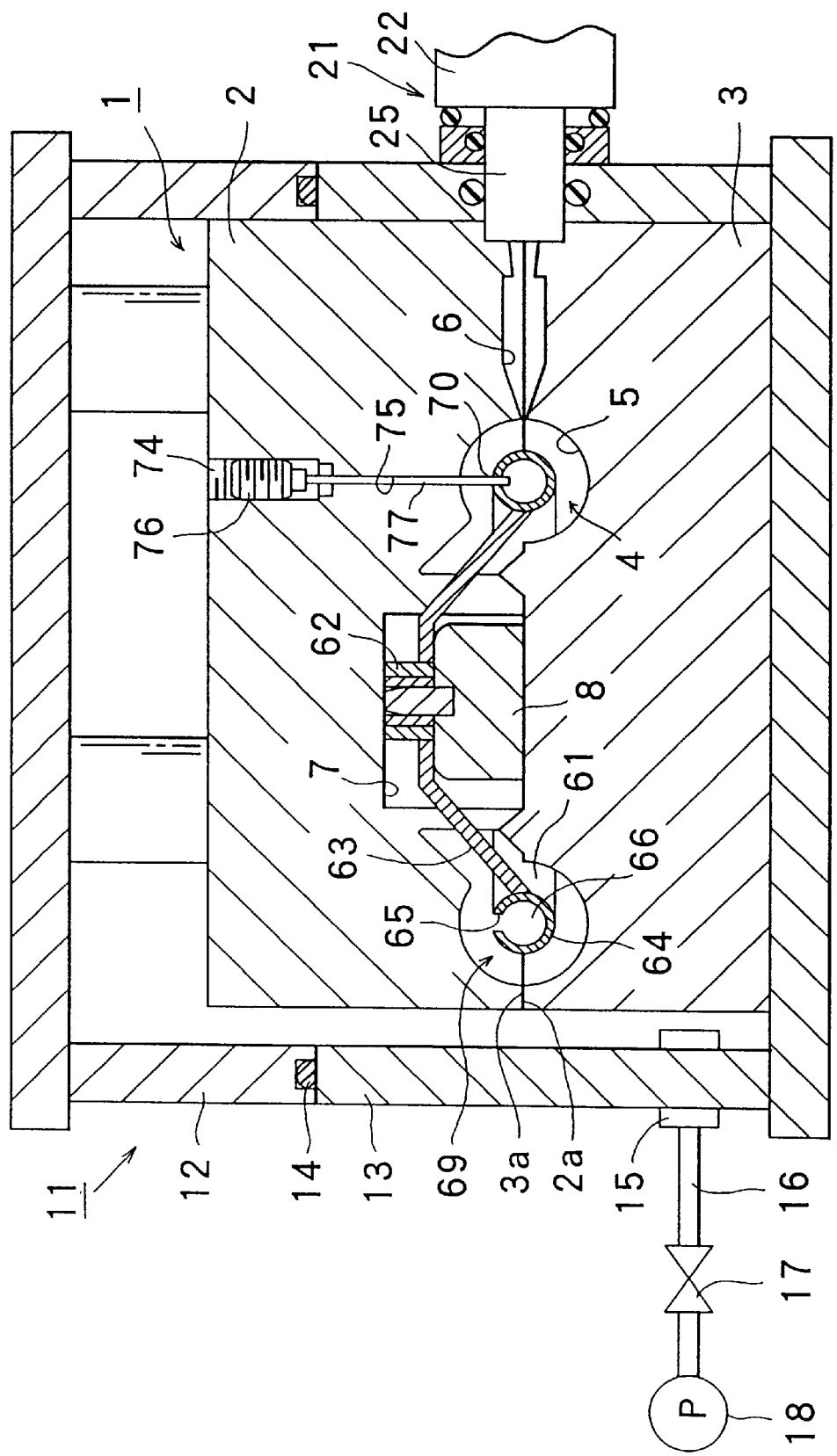
FIG. 39 is a sectional view of the upper and lower mold portions joined together in the same process.

With reference to FIG. 39, the upper mold portion 2 has a support pin mechanism for supporting the metal core 61. The support pin mechanism comprises an internally threaded hole 74 formed in an upper part of the upper mold portion 2, a through hole 75 extending from the internally threaded hole 74 to the cavity wall 5, an externally threaded adjusting rod 76 fitted threadedly in the internally threaded hole 74, and the support pin 77 extending from the adjusting rod 76 to the cavity 4 through the through hole 75. The support pin 77 and the adjusting rod 76 have a communicating passage 78 extending from the lower end of the support pin 77 to the upper end of the adjusting rod 76 and having an upper end connected with the interior of the vacuum casing 11.

The following is a stepwise description of the process which is employed for manufacturing a polyurethane covering by RIM techniques:

(1) Equal to step (1) of the process according to the first embodiment.

(2) Step (2) of the process according to the ninth embodiment is followed for setting the metal core 61 on the lower mold portion 3 and positioning its open hole 65 in the final filling portion 69, as is obvious from FIG. 38A. The upper and lower mold portions 2 and 3 are joined together, while the upper and lower casing portions 12 and 13 are joined together, as shown in FIG. 39. As a result, the support pin 77 has its lower end fitted in the suction hole 70 of the ring 64 so that its internal communicating passage 78 connected with the hollow interior 66 of the ring 64, as is obvious from a comparison of FIGS. 40A and 40B. The support pin 77 has, adjacent its lower end, a shoulder 79 held against the edge of the suction hole 70 to support the ring 64 exactly in the cross sectional center of the cavity 4.

Figure 40A:
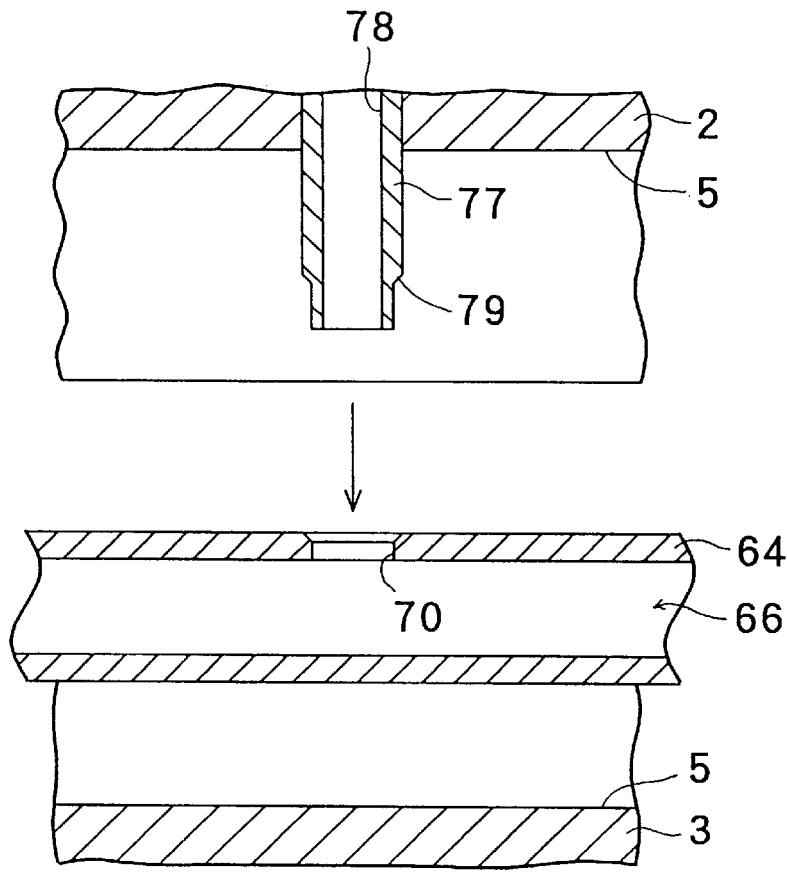
FIG. 40A is a sectional view showing a support pin and a suction hole in the metal core before the two mold portions are joined together.
Figure 40B:
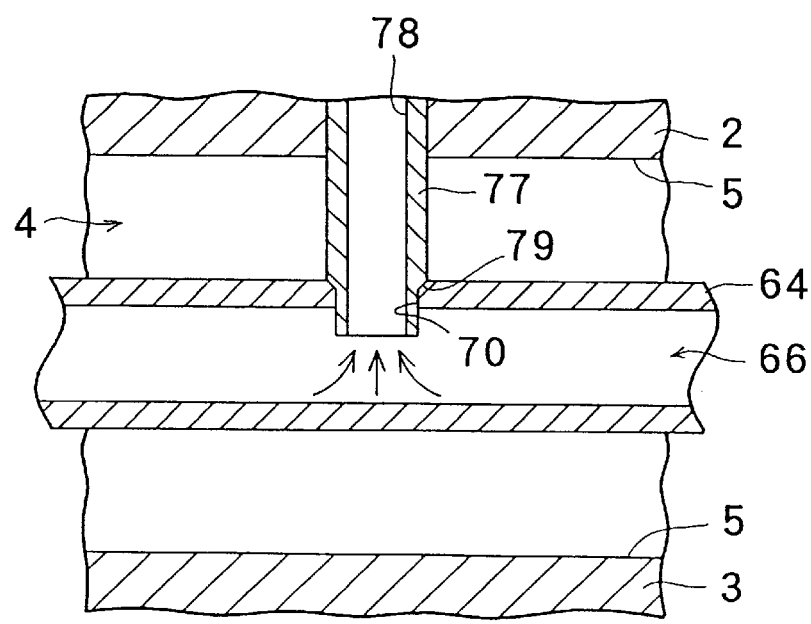
FIG. 40B is a sectional view showing the support pin engaged in the suction hole when the two mold portions are joined together.

(3) In addition to step (3) of the process according to the ninth embodiment, the evacuation of the hollow interior 66 of the ring 64 is made through its suction hole 70 via the communicating passage 78, as shown in FIG. 40B.

(4) Step of injecting a surface-forming material: Equal to step (4) of the process according to the ninth embodiment (see FIGS. 30 and 31).

Figure 41:
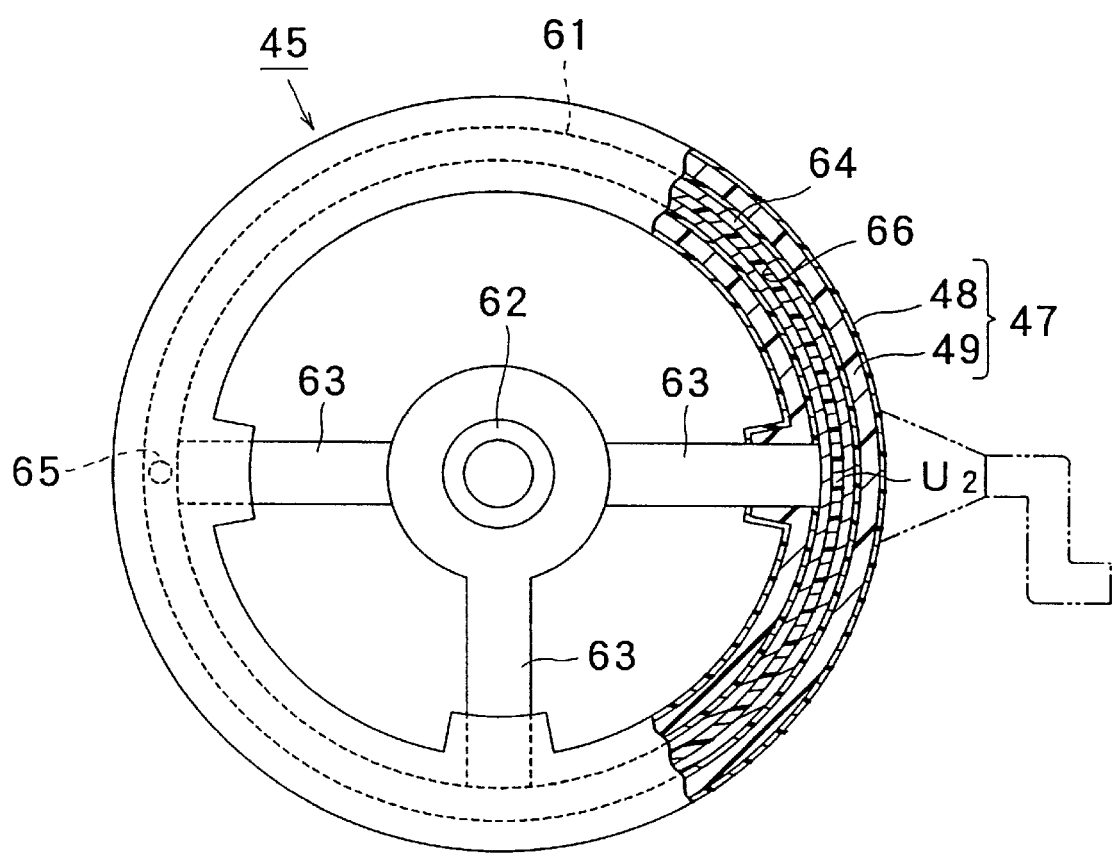
FIG. 41 is a top plan view, partly in section, of a polyurethane covering molded by the process according to the tenth embodiment.
Figure 42:
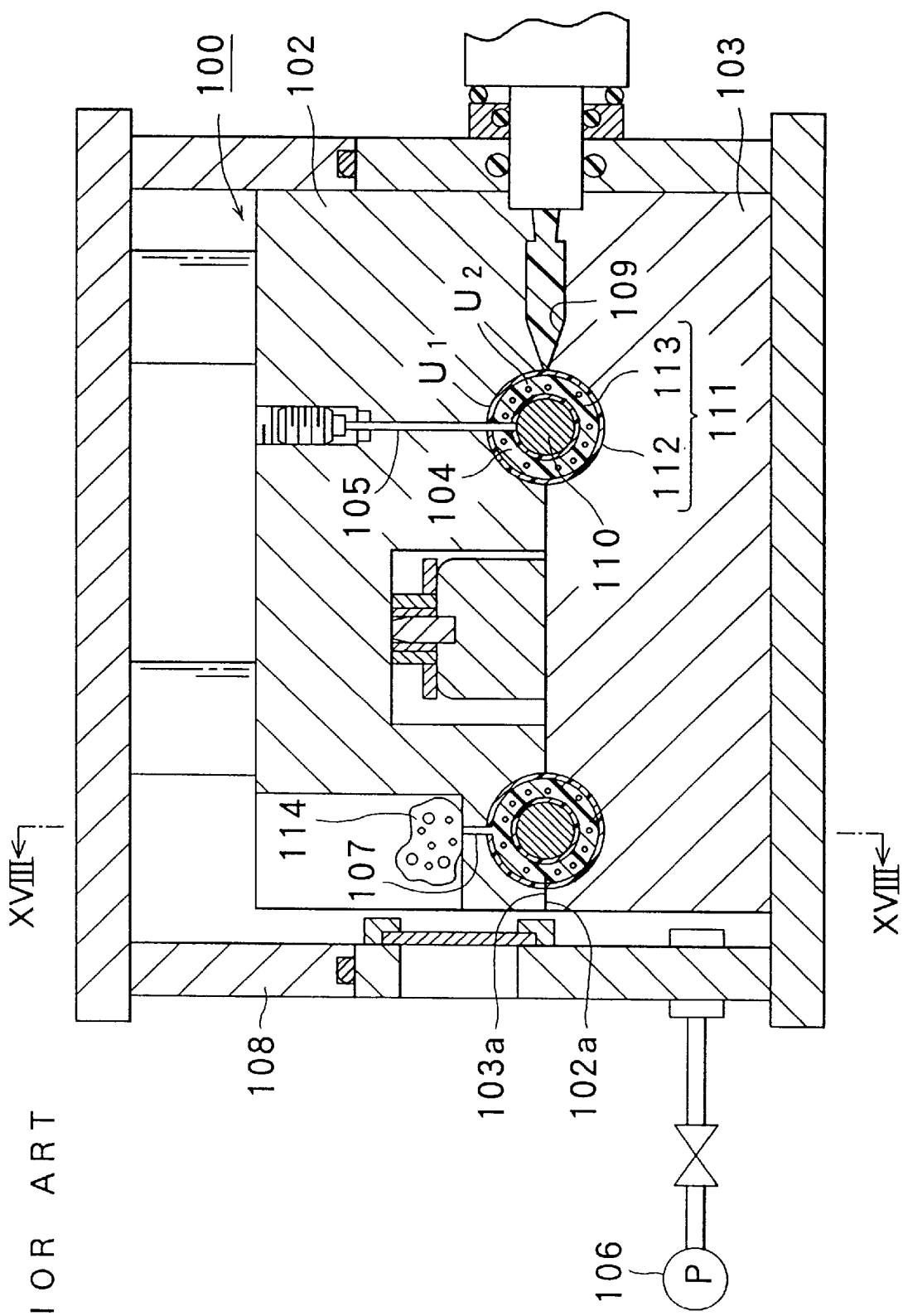
FIG. 42 is a sectional view showing a known process for molding a polyurethane covering.
Figure 43:
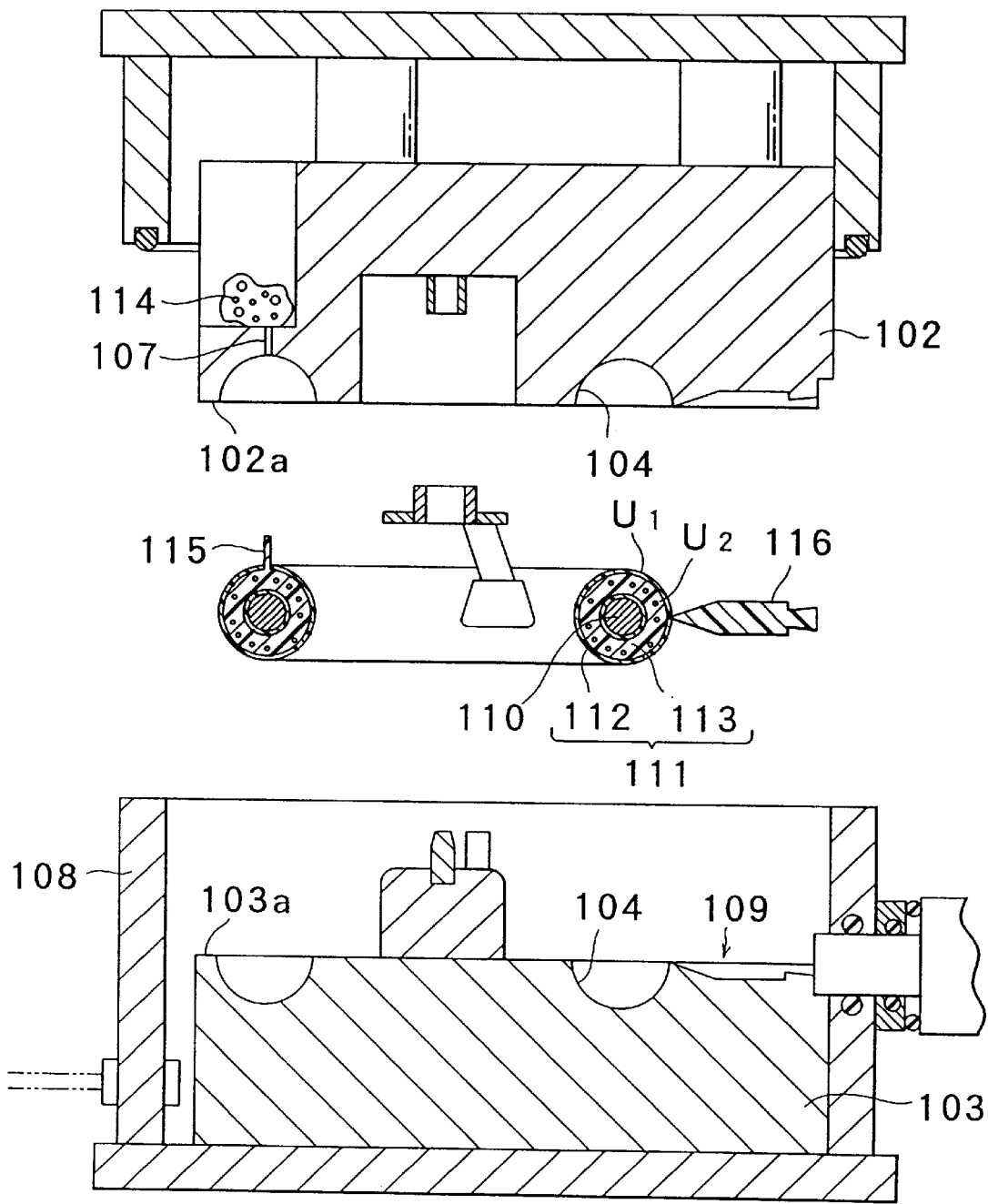
FIG. 43 is a sectional view showing the step of removing a molded product from the mold in the known process.
Figure 44:
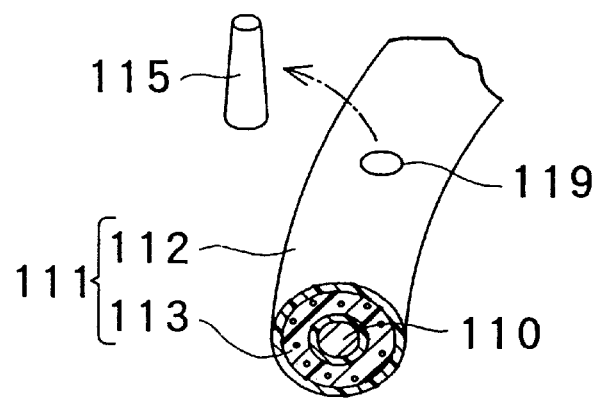
FIG. 44 is a fragmentary perspective view of the molded polyurethane covering from which a vent-hole burr has been cut off.
Figure 45:
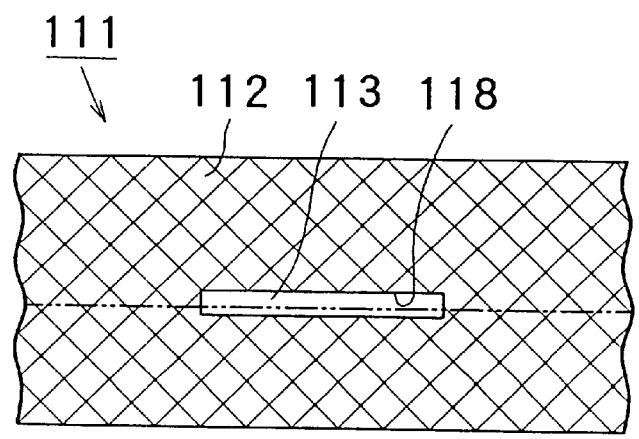
FIG. 45 is a front elevational view of a part of the same polyurethane covering.
Figure 46:
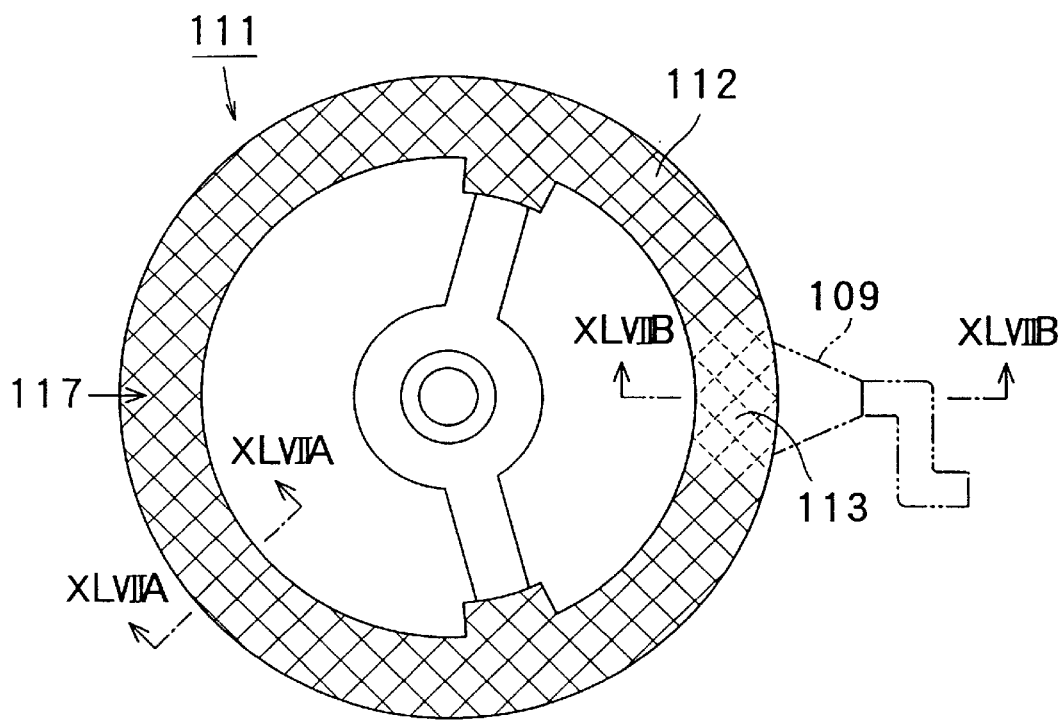
FIG. 46 is a top plan view of the same polyurethane covering.
Figure 47A:
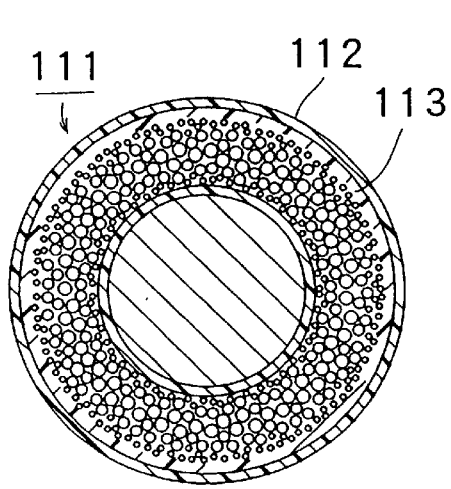
FIG. 47A is a sectional view taken along the line XLVIIA—XLVIIA of FIG. 46.
Figure 47B:
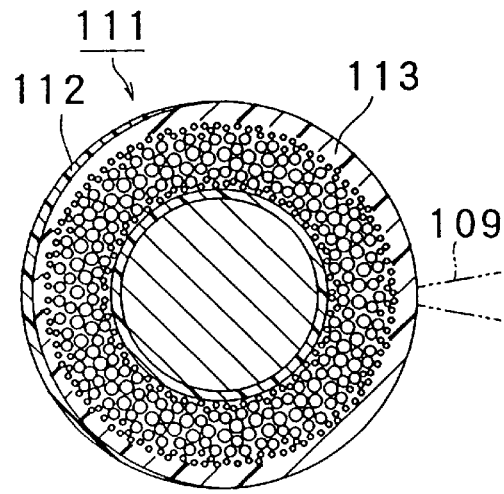
FIG. 47B is a sectional view taken along the line XLVIIB—XLVIIB of FIG. 46.

(5) Step of injecting an inner-forming material: Equal to step (5) of the process according to the ninth embodiment (see FIGS. 32, 33 and 34). The hollow interior 66 of the ring 64 is, however, still more unlikely to have an elevated pressure, since its evacuation is continued through the suction hole 70 and the passage 78 even when the polyurethane materials U1 and U2 are flowing into the hollow interior 66. Therefore, this additional suction admits a greater amount of polyurethane materials U1 and U2 than does the hollow interior 66 of the metal core employed by the process according to the ninth embodiment. FIG. 41 shows the hollow interior 66 filled with the polyurethane material U2 along its whole length.

(6) Step of removing a molded product from the mold: Equal to step (7) of the process according to the first embodiment (see FIG. 41).

Attempts were made to ascertain the results of the processes according to the ninth and tenth embodiments by making polyurethane coverings for steering wheels as shown at Test Examples 1 to 4 and Comparative Examples 1 and 2 in Table 1, and measuring the weight of the polyurethane materials flowing into the ring of each metal core and the distance thereby occupied along the ring.

Test Examples 1 and 2 correspond to the ninth embodiment which does not include the evacuation of the hollow interior of the ring through the support pin, though the cavity is evacuated. They differ from each other in the diameter of the open hole formed in the wall of the ring of the metal core which they employed. Test Examples 3 and 4 correspond to the tenth embodiment including both the evacuation of the cavity and the evacuation of the hollow interior of the ring through the support pin, and differ from each other in the diameter of the open hole formed in the wall of the ring of the metal core which they employed. Comparative Examples 1 and 2 show the molding operation carried out at normal pressure by employing the apparatus employed by the process according to the ninth embodiment, and also differ from each other in the diameter of the open hole formed in the wall of the ring of the metal core which they employed.

The ring of every metal core employed had a diameter of about 350 mm as measured between two points on the cross sectional center of its hollow interior, a length of about 1100 mm as measured along the cross sectional center of its hollow interior, and an inside diameter of 10 mm.

TABLE 1

|  | Test Example 1 | Test Example 2 | Test Example 3 | Test Example 4 | Comp. Example 1 | Comp. Example 2 |
| --- | --- | --- | --- | --- | --- | --- |
| Pressure in cavity (Torr) | 50 | 50 | 50 | 50 | normal pressure | normal pressure |
| Evacuation through support pin | none | none | included | included | — | — |
| Open hole diameter (mm) | 6 | 2.5 | 6 | 2.5 | 6 | 2.5 |
| Flowing weight into ring (g) | 29 | 10 | 35 | 18 | 0.9 | 0.2 |
| Flowing distance into ring (min) | 900 | 370 | 1100 | 520 | 30 | 3 |

As a result of both of Comparative Examples 1 and 2, the presence of air having atmospheric pressure in the ring allowed only a very small weight of polyurethane materials occupying only a very short distance to flow into the ring. Accordingly, the comparative examples failed to have the hollow interior of the ring admit the gathering mass of the surface-forming polyurethane material and the inner-forming polyurethane material at the leading ends of its streams containing an excess of bubbles as intended by this invention, and yielded polyurethane coverings having an outward appearance which was defective due to pinholes.

On the other hand, Test Example 1 in which the cavity was evacuated allowed as much as 29 g of polyurethane materials to flow into the ring and yielded a polyurethane covering having no defect in outward appearance. Test Example 2 allowed only 10 g of polyurethane materials to flow into the ring apparently because of its open hole having a diameter of as small as 2.5 mm, but yielded a polyurethane covering having no defect in outward appearance. It is to be understood that no smaller open hole diameter is desirable for the process according to the ninth embodiment, since it is desirable to allow an outflow 114 to have a weight of, say, 15 to 30 g as stated before in the description of the related art.

As a result of Test Example 3 including the evacuation of the hollow interior of the ring through the support pin, as well as the evacuation of the cavity, the ring was filled with the polyurethane materials along its whole circumference and there was naturally obtained a polyurethane covering having no defect in outward appearance. Test Example 4 allowed as much as 18 g of polyurethane materials to flow into the ring despite its open hole having a diameter of as small as 2.5 mm and yielded a polyurethane covering having no defect in outward appearance.

The inventors of this invention have studied the results of these examples and found that the process according to the ninth embodiment is preferably employed for making a polyurethane covering for a steering wheel having in the wall of its ring an open hole having an area of from 4.8 to 50.0 mm$^2$, more preferably from 7.0 to 35.0 mm$^2$. The inventors have also found that the process according to the tenth embodiment is preferably employed for a steering wheel having such an open hole with an area of from 3.0 to 50.0 mm$^2$, more preferably from 6.0 to 30.0 mm$^2$. The area of the open hole as stated above may be either that of a single hole, or the sum of the areas of two or more holes.

Although the invention has been described by way of the preferred embodiments thereof, it is to be understood that variations or modifications may be made without departing from the scope and spirit of this invention, as mentioned by way of example below:

(1) Referring to the first, fifth and sixth embodiments, the substantial whole 49a of the inner portion 49 and that part 49b thereof which is formed in the vicinity of the gate may have a ratio by volume of, say, 1:1 to 10:1, though this range is not limitative;

(2) Referring to the fourth, sixth and eighth embodiments, the surface portion 48 which is formed by a first surface-forming material may have a length equal to, say, 1/10 to 1/2 of the whole length of the cavity, though this range is not limitative;

(3) The polyurethane materials may contain a small amount of a foaming agent (e.g. water); and (4) This invention is applicable to the manufacture by RIM techniques of not only a polyurethane covering for a steering wheel, but also a variety of other two-colored molded products, such as a pad for a steering wheel, a cover for a console, or globe box, an arm rest and an air spoiler.

As many apparently widely different embodiments of this invention may be made without departing from the spirit and scope thereof, it is to be understood that the invention is not limited to the specific embodiments thereof except as defined in the appended claims.

What is claimed is:

1. A reactive injection molding process for manufacturing a two-colored molded polyurethane product comprising:
    creating a reduced pressure in a molded cavity to form a reduced pressure cavity;
    forming a surface portion of the polyurethane product by injecting a surface-forming polyurethane material containing a coloring material through a gate into the reduced pressure cavity;
    forming an inner portion of the polyurethane product by:
        injecting a first portion of an inner-forming polyurethane material not having the coloring material, into the reduced pressure cavity, to form substantially all of an inner portion of the polyurethane product; and
        injecting a second portion of an inner-forming polyurethane material having the same coloring material as the surface portion, into said reduced pressure cavity to form a remaining part of the inner portion and a gate burr in the vicinity of the gate; and
    removing the molded product and removing the gate burr so that an exposed portion of the second inner-forming polyurethane material has the same color as the surface portion.

2. A process as set forth in claim 1, wherein the surface-forming polyurethane material contains a mold release agent and the first and second portions of the inner-forming polyurethane material do not contain a mold release agent.

3. A process as set forth in claim 1, wherein the surface-forming polyurethane material has a higher rate of urethane reaction than the first and second portions of the inner-forming polyurethane material.

4. A reactive injection molding process for manufacturing a molded polyurethane product comprising:
    creating a reduced pressure in a mold cavity to form a reduced pressure cavity;
    injecting a surface-forming polyurethane material through a gate into the reduced pressure cavity and curing the surface-forming polyurethane material at a first reaction rate; and
    injecting an inner-forming polyurethane material into the reduced pressure cavity and curing the inner-forming polyurethane material at a second reaction rate while avoiding a reduction in thickness of the surface-forming polyurethane material in the vicinity of the gate,
    wherein the first reaction rate is higher than the second reaction rate.

5. A process as set forth in claim 4, wherein the surface-forming polyurethane material contains coloring material and the inner-forming polyurethane material does not contain coloring material.

6. A process as set forth in claim 4, wherein the surface-forming polyurethane material contains a mold release agent and the inner-forming polyurethane material does not contain a mold release agent.

7. A reactive injection molding process for manufacturing a two-colored molded polyurethane product comprising:
    creating a reduced pressure in a mold cavity to form a reduced pressure cavity;
    injecting through a gate a surface-forming polyurethane material into the reduced pressure cavity and curing the surface-forming polyurethane material at a first reaction rate; and
    after completion of said curing of the surface-forming polyurethane material, injecting an inner-forming polyurethane material into the reduced pressure cavity and curing the inner-forming polyurethane material at a second reaction rate while avoiding a reduction in thickness of the surface-forming polyurethane material in the vicinity of the gate.

8. A process as set forth in claim 7, wherein said injecting of the inner-forming polyurethane material comprises:
    injecting a first inner-forming polyurethane material which is free of any coloring material and
    injecting a second inner-forming polyurethane material containing coloring material.

9. A process as set forth in claim 7, wherein the first reaction rate is higher than the second reaction rate.

10. A reactive injection molding process for manufacturing a molded polyurethane product comprising:
    creating a reduced pressure in a mold cavity to form a reduced pressure cavity;
    injecting through a gate a first amount of a surface-forming polyurethane material into the reduced pressure cavity and curing the first amount of surface-forming polyurethane material;
    subsequently injecting a second amount of a surface-forming polyurethane material into the reduced pressure cavity; and
    injecting an inner-forming polyurethane material into the reduced pressure cavity while avoiding a reduction in thickness of the surface-forming polyurethane material in the vicinity of the gate.

11. A process as set forth in claim 10, wherein said injecting of the inner-forming polyurethane material comprises:
    injecting a first inner-forming polyurethane material which is free of any coloring material and
    injecting a second inner-forming polyurethane material containing coloring material.

12. A process as set forth in claim 10, wherein the surface-forming polyurethane material has a higher rate of urethane reaction than the inner-forming polyurethane material.

* * * * *